(12) United States Patent
Long

(10) Patent No.: US 8,079,312 B2
(45) Date of Patent: Dec. 20, 2011

(54) STEERING WHEEL TABLE

(76) Inventor: Ronald W. Long, Dover, AR (US)

( * ) Notice: Subject to any disclaimer, the term of this patent is extended or adjusted under 35 U.S.C. 154(b) by 289 days.

(21) Appl. No.: 12/242,465

(22) Filed: Sep. 30, 2008

(65) Prior Publication Data

US 2009/0084291 A1    Apr. 2, 2009

Related U.S. Application Data

(60) Provisional application No. 60/997,274, filed on Oct. 1, 2007.

(51) Int. Cl.
A47B 23/00    (2006.01)

(52) U.S. Cl. ............................ 108/44; 108/152; 224/276

(58) Field of Classification Search ................. 108/44, 108/45, 46, 47, 48, 49, 152; 248/354.6; 224/276
See application file for complete search history.

(56) References Cited

U.S. PATENT DOCUMENTS

| | | | | |
|---|---|---|---|---|
| 1,391,755 A | * | 9/1921 | Boysen | 108/47 |
| 1,738,535 A | * | 12/1929 | McGinley | 108/44 |
| 1,883,714 A | * | 10/1932 | Gray | 312/233 |
| 1,888,736 A | * | 11/1932 | Park | 108/44 |
| 1,956,060 A | * | 4/1934 | Bramming et al. | 108/46 |
| 2,141,849 A | | 12/1938 | Baer | |
| 2,299,025 A | * | 10/1942 | McGinley | 108/44 |
| 2,693,400 A | * | 11/1954 | Erickson | 108/46 |
| 2,746,821 A | | 5/1956 | Schroeder | |
| 2,833,608 A | * | 5/1958 | Tobias | 108/44 |
| 2,866,381 A | * | 12/1958 | Alldredge | 108/44 |
| 3,266,443 A | * | 8/1966 | Lee | 108/46 |
| 3,939,986 A | * | 2/1976 | Pierro | 108/44 |
| 4,375,881 A | | 3/1983 | Mitchell | |
| 4,749,161 A | | 6/1988 | Falcone | |
| 4,792,163 A | * | 12/1988 | Kulle | 108/44 |
| 4,805,867 A | | 2/1989 | McAllister | |
| 4,830,243 A | * | 5/1989 | Mann | 108/44 |
| 4,890,559 A | | 1/1990 | Martin | |
| 4,915,035 A | | 4/1990 | Clark et al. | |
| 5,060,581 A | | 10/1991 | Malinski | |
| 5,177,665 A | * | 1/1993 | Frank et al. | 108/44 |
| D335,226 S | | 5/1993 | Horne | |
| 5,320,321 A | * | 6/1994 | Muncada | 248/447.2 |
| 5,386,785 A | | 2/1995 | Naor | |
| 5,511,493 A | | 4/1996 | Kanehl, Jr. | |
| 5,558,026 A | | 9/1996 | Seibert | |
| 5,662,047 A | | 9/1997 | Metcalf | |
| 5,749,306 A | | 5/1998 | Breuner | |
| 5,845,585 A | | 12/1998 | Meeus et al. | |
| 5,909,922 A | * | 6/1999 | Dugas | 108/47 |
| 6,036,158 A | | 3/2000 | Raasch | |
| 6,038,983 A | | 3/2000 | Lendl | |
| 6,062,145 A | | 5/2000 | Lin | |
| 6,148,738 A | | 11/2000 | Richter | |

(Continued)

Primary Examiner — Jose V Chen
(74) Attorney, Agent, or Firm — Dunlap Codding, P.C.

(57) ABSTRACT

An adjustable steering wheel table for a vehicle steering wheel having a top section and a bottom section. The steering wheel table includes a table member, at least two wheel grasping arms and a brace arm assembly. The table member has a length, a width, an underside and a front edge. The at least two wheel grasping arms are connected to the table member and extend beyond the front edge of the table member and are releasably engageable with at least a portion of the top section of the vehicle steering wheel. The brace arm assembly is pivotally connected to at least one of the underside and edge of the table member and releaseably engageable with the bottom section of the vehicle steering wheel.

16 Claims, 15 Drawing Sheets

U.S. PATENT DOCUMENTS

| | | |
|---|---|---|
| 6,192,806 B1 | 2/2001 | Chen |
| 6,279,800 B1 | 8/2001 | Lee |
| 6,408,769 B1 | 6/2002 | Lewis |
| 6,412,425 B1 | 7/2002 | Chen |
| 6,494,148 B1 | 12/2002 | Mullaney |
| 6,505,797 B1 | 1/2003 | Dempsey |
| D510,306 S | 10/2005 | Swan et al. |
| 7,793,597 B2 * | 9/2010 | Bart et al. ............... 108/44 |
| 2004/0144196 A1 | 7/2004 | Thomas |

\* cited by examiner

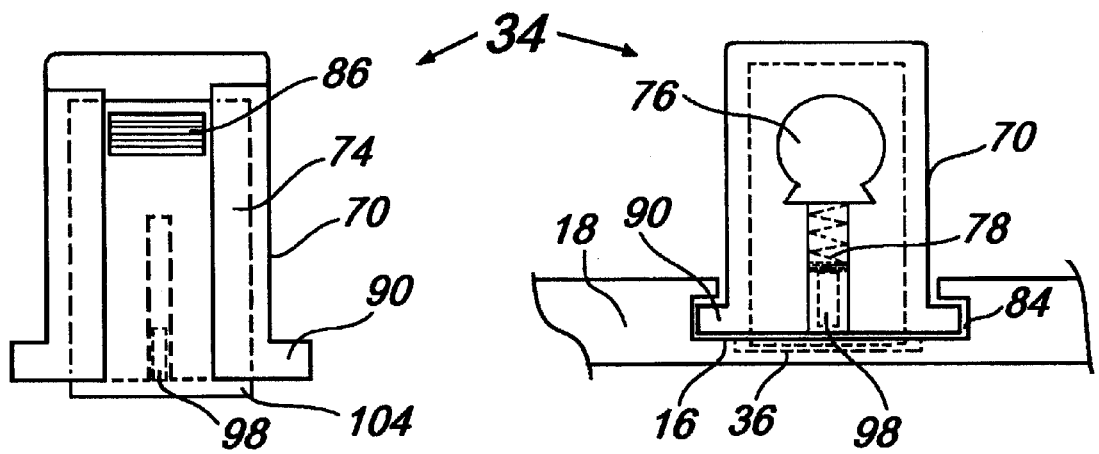
FIG. 7
FIG. 8
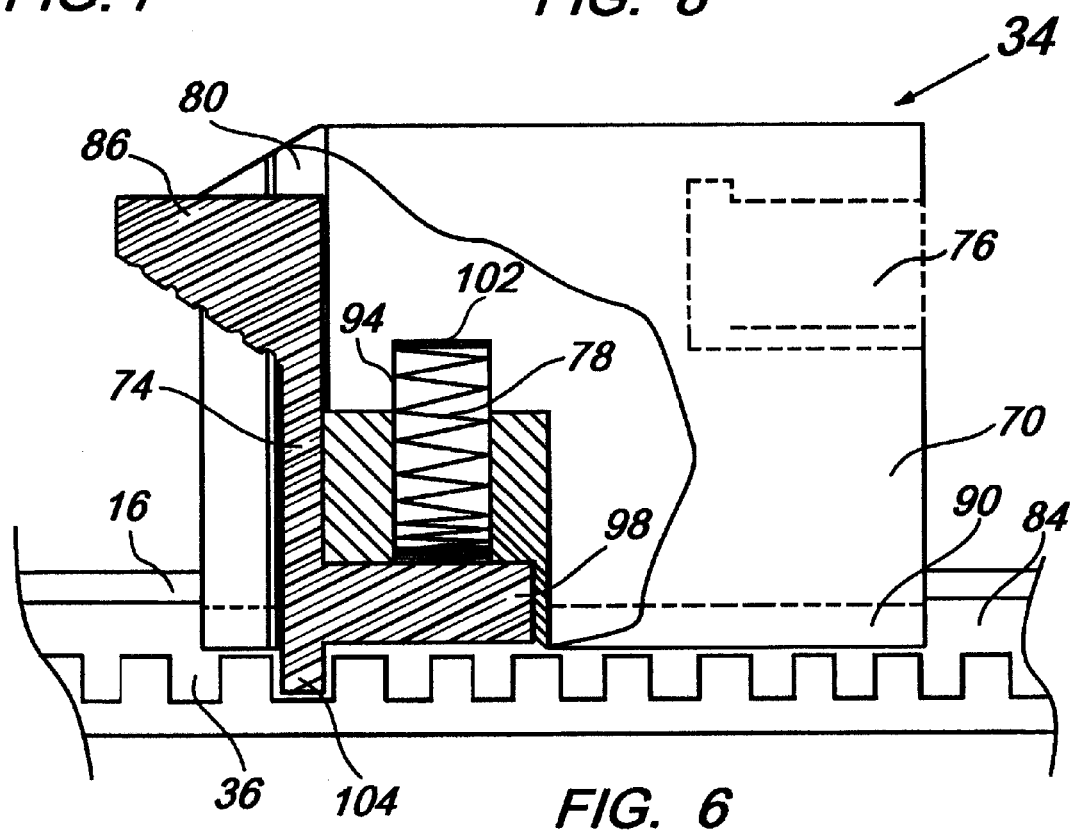
FIG. 6

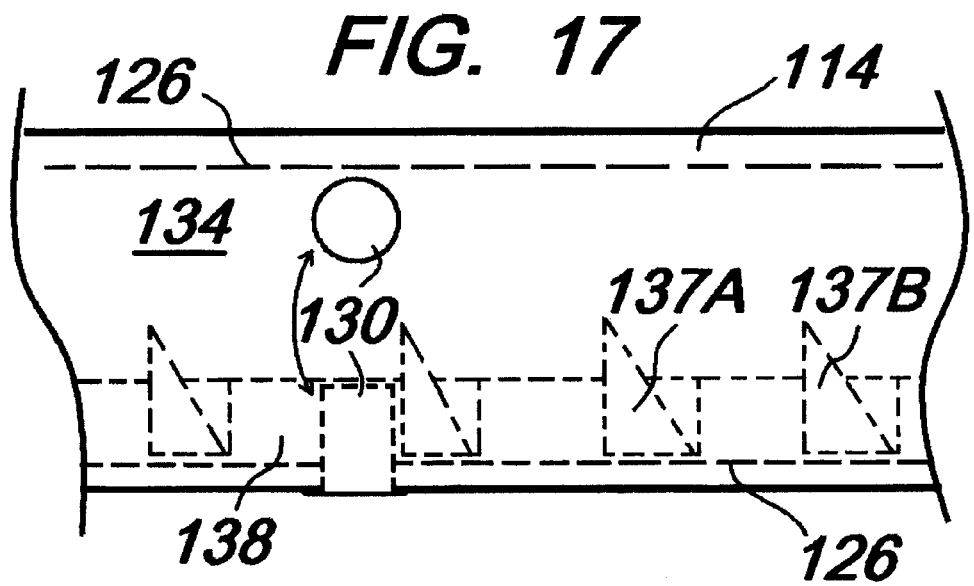
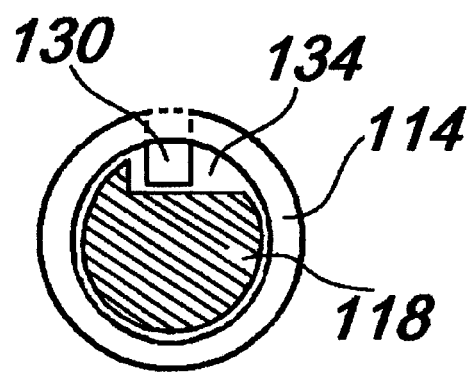
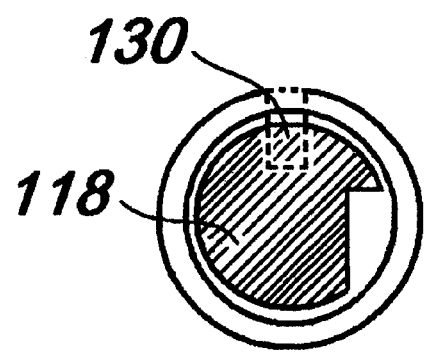
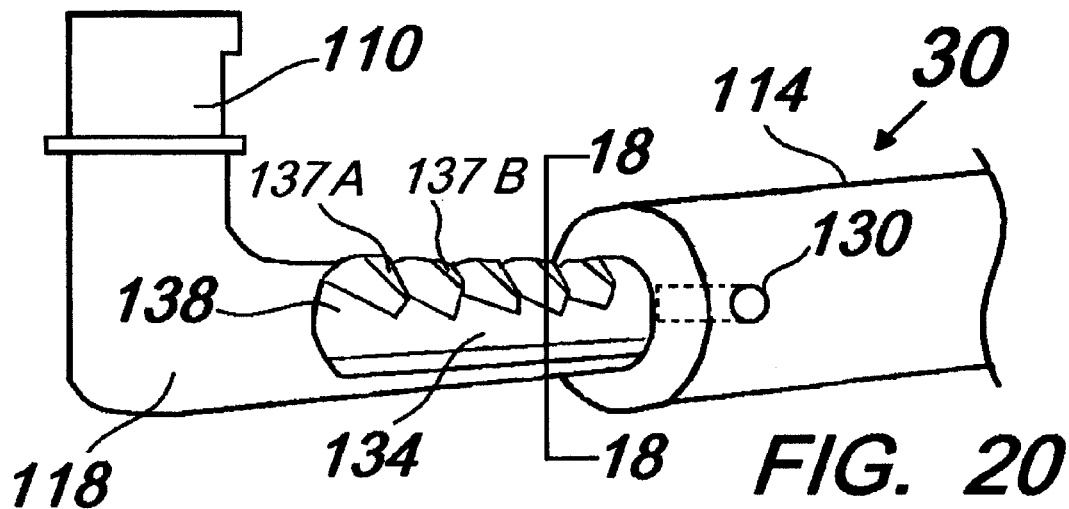

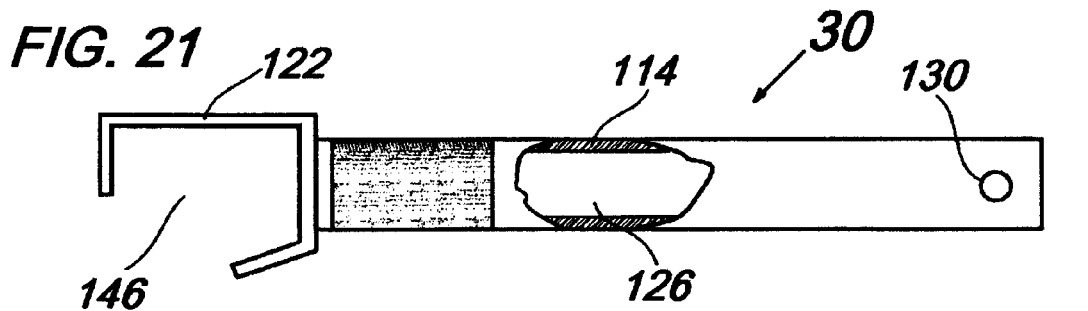
FIG. 21
FIG. 22 A
FIG. 22 B
FIG. 22 C
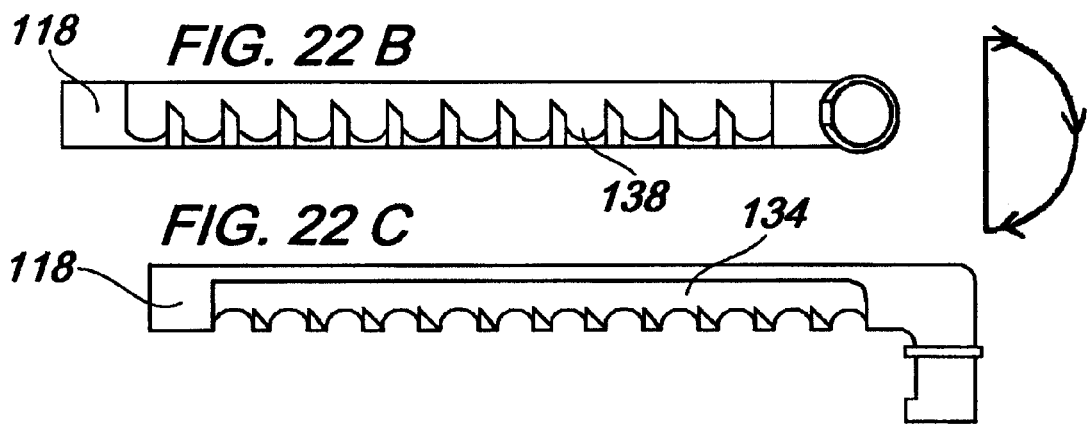
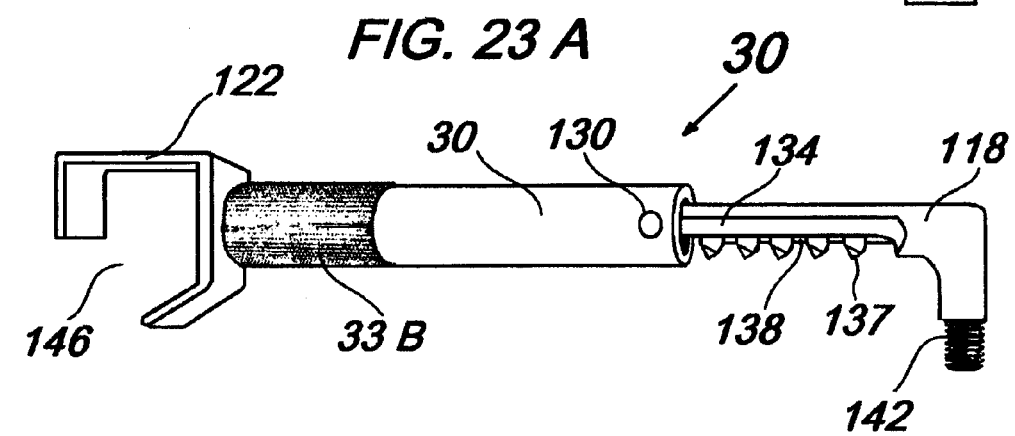
FIG. 23 A
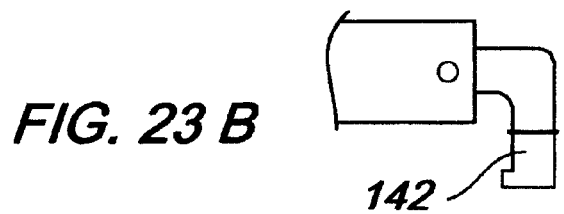
FIG. 23 B

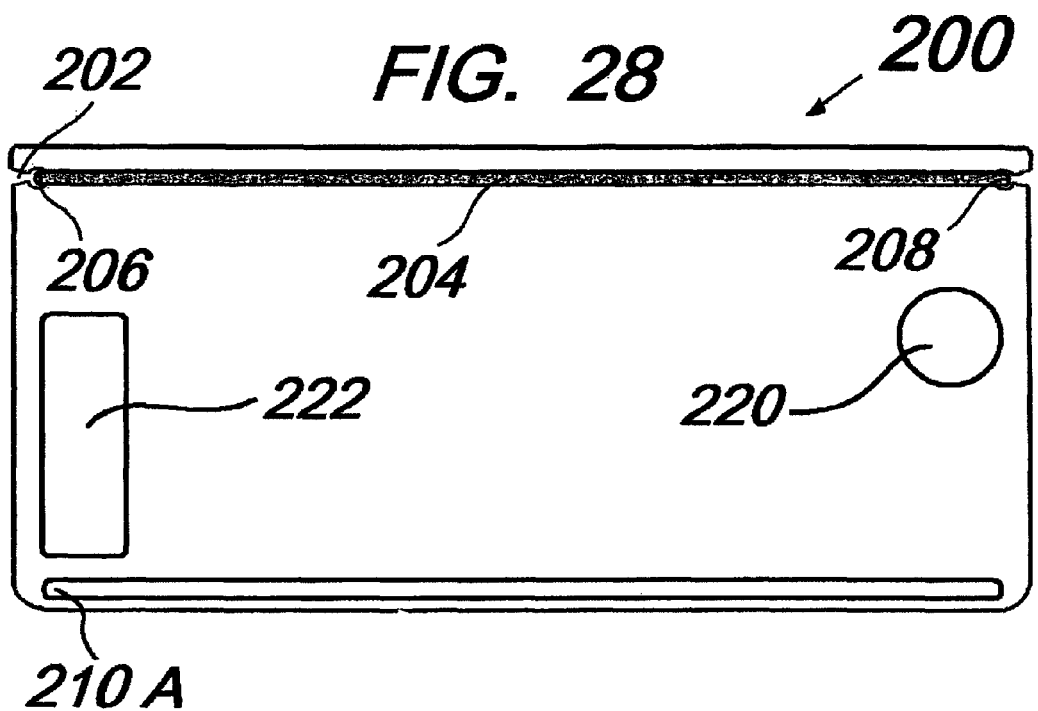
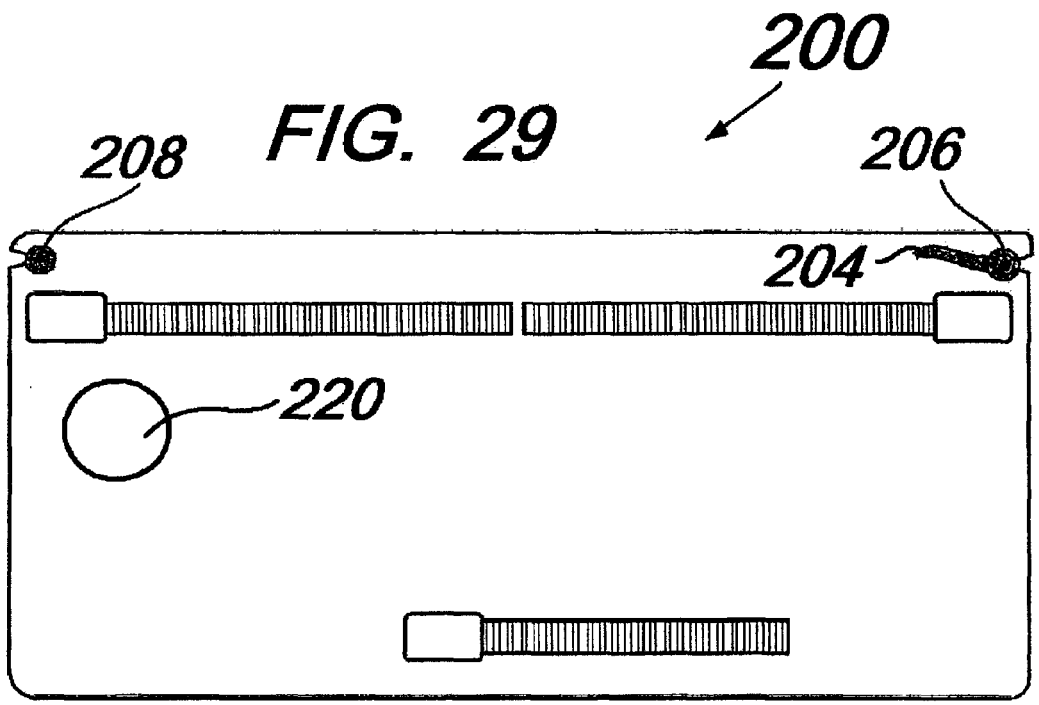

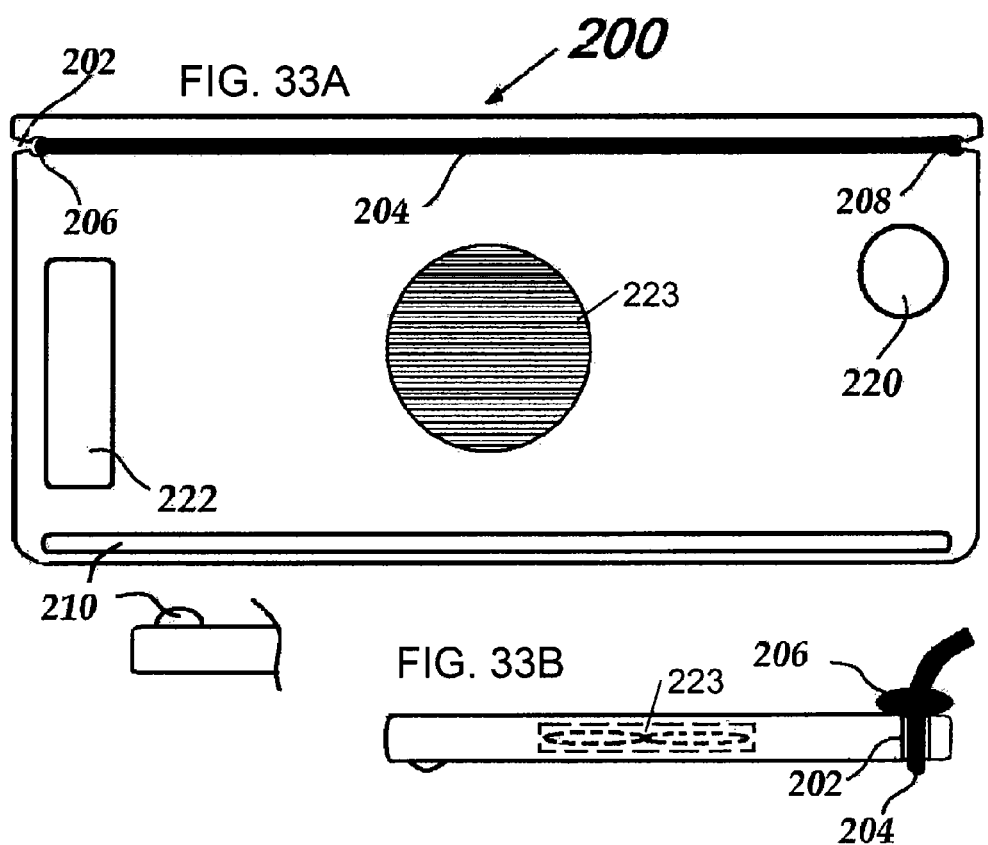

STEERING WHEEL TABLE

CROSS REFERENCE TO RELATED APPLICATIONS

This application claims priority to a U.S. provisional patent application identified by U.S. Ser. No. 60/997,274, entitled "Steering Wheel Table", which was filed on Oct. 1, 2007, which is hereby incorporated herein by reference in its entirety.

BACKGROUND

This invention relates to a steering wheel table to be used in any vehicle equipped with a steering wheel which will accommodate the attachment hardware used by the invention. More people are looking for a strong, light, easy to handle, flat surface, which will enable them to use their vehicle steering wheel as a platform to do numerous tasks. Some of these tasks may include but are not limited to, laptop computer use, book reading, working on paperwork and eating. Many inventors have sought to solve this problem of creating the one size fits all steering wheel tables, but due to many variations in vehicle steering wheel construction and design the problem is complex. Some of these problems are diameter of the steering wheel, convex or concave wheel center due to airbag presence or absence, wheel thickness, wheels with coverings (leather or cloth) and tilt or non tilt steering wheels. The fastening technique and design of the table must address all these obstacles and yet remain, strong, efficient and user friendly. These are the very problems my invention both addresses and solves, making it the perfect multi task table for any vehicle. I will point out some of my inventions strengths against faults in prior patented art work.

U.S. Pat. No. 5,386,785 to Peter Naor, Feb. 7, 1995, demonstrates the problem of attachment to steering wheels of various diameters 1. As you see the technique for attaching is to surround the entire wheel which may work on one size steering wheel but fall short or worse yet be completely incompatible with a larger or smaller wheel. Also the thickness of the wheel 9 could cause additional problems, especially if the steering wheel had a covering. Also with the straight backboard 2 it would be impossible to accommodate a center airbag which protruded out from the wheel center.

U.S. Pat. No. 5,511,493 to Donald Kanehl, Jr., Apr. 30, 1996, fails to meet the stability needed to insure a platform that will not be easily dislodged due to lack of strong connection points on the wheel. The hook over the top of wheel 16 is not spread far enough apart to create stability. Also the tray table is unsupported below severely limiting the support needed to ensure no damage could come from a heavy work load or pressing down on the table. The section 32 appears to be a weak point to support the load that may be placed on the outer edge of the table. There also does not appear to be any device for adjusting the angle of the table relative to the steering wheel.

U.S. Pat. No. 5,558,026 issued to David S. Seibert, Sep. 24, 1996, again demonstrates the attachment problem with the flat back 12, 22 which are completely incompatible with a center mounted airbag which protrudes out. Also the sideboards 36 from top to bottom (to create support) would interfere with laptops with side mounted USB ports and also the freedom to use a mouse. Top mounting 14 again creates the same unstable configuration used by many other patent applicants.

U.S. Pat. No. 6,412,425 issued to Zhong Yu Chen, Jul. 2, 2002, has a similar problem with wheel diameter variation and also an unsupported table creating tremendous pressure on the two hinges 11R used to support the weight of the work load, possibly leading to table failure. Although the top has a clip 4 to attach the table, the sides are at a set radius creating stability problems with small wheels and possibly unable to accommodate oversize wheels. The cup holder 2 and pencil tray 50, also interrupt the table work surface and may also encourage the user to inadvertently place liquids near a laptop when using the table to support the laptop.

SUMMARY

The present invention relates to a steering wheel table configured for attachment to a vehicle's steering wheel. More particularly, but not by way of limitation, the steering wheel table is configured to suspend a table member above a lower portion of the steering wheel and also preferably above the lower portion and a center portion of the steering wheel. Although steering wheel tables are known in the art most are replete with drawbacks as discussed above. Typical drawbacks associated with most steering wheel tables include problems dealing with variations in the diameter of the steering wheel, convex or concave steering wheel geometries due to airbag presence or absence, variability in steering wheel thickness, steering wheels with coverings (leather or cloth), tilt or non-tilt steering wheels poor stability, and poor load capacity.

In one embodiment, the present invention relates to an adjustable steering wheel table for a vehicle steering wheel having a top section and a bottom section. The steering wheel table includes a table member, at least two wheel grasping arms and a brace arm assembly. The table member has a length, a width, an underside and a front edge. The at least two wheel grasping arms are connected to the table member and extend beyond the front edge of the table member and are releasably engageable with at least a portion of the top section of the vehicle steering wheel. The brace arm assembly is pivotally connected to at least one of the underside and edge of the table member and releaseably engageable with the bottom section of the vehicle steering wheel.

In another embodiment, the wheel grasping arms of the steering wheel table operably slide on tracks located either on an exterior surface of the table member or formed within the table member. The wheel grasping arms slide toward and away from one another to adjust the steering wheel table to fit various steering wheel diameters. The brace arm assembly of the steering wheel table can also be operable on a track located either on an exterior surface of the table member or within the table member to permit lateral adjustment of the brace arm assembly relative to the table member. The brace arm assembly engages with a bottom of the steering wheel to provide vertical stability. Furthermore, in a preferred embodiment, the brace arm assembly can be selectively movable between extended and retracted positions (and at various intermediate positions therebetween) to adjust the height and/or angle of the table member relative to the steering wheel. Because in a preferred embodiment the steering wheel table of the present invention rigidly contacts the steering wheel of a vehicle at three points, the stability and support of the table member are greatly enhanced.

Therefore an object of the present invention, but not by way of limitation, is to provide a steering wheel table which is utilizable with substantially any vehicle steering wheel. Other objects and features of the invention will become apparent to one skilled in the art when the present patent application is read in conjunction with the attached drawings.

DESCRIPTION OF THE SEVERAL VIEWS OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments. Further, the figures are not necessarily to scale and certain features and certain views of the figures may be shown exaggerated in scale or in schematic in the interest of clarity and conciseness.

FIG. 6 is a cutaway, side elevation view of the dolly in FIG. 5 in association with a track.

FIG. 7 is a front elevation view of the dolly of FIGS. 5 and 6.

FIG. 8 is a rear elevation view of the dolly of FIGS. 5 and 6.

FIG. 17 is a perspective view of a brace arm assembly in accordance with the present invention.

FIG. 18 is a cross sectional view of the brace arm assembly of FIG. 17 in a travel position taken along the lines 18-18 of FIG. 20.

FIG. 19 is a cross sectional view of the brace arm assembly of FIG. 17 in a locked position taken along the line 18-18 of FIG. 20 where a brace arm barrel of the brace arm assembly has been rotated 90°.

FIG. 20 is a cross sectional view of the brace arm assembly of FIG. 17.

FIG. 21 is a cutaway view of the brace arm assembly of FIG. 17.

FIG. 22A is a side view illustrating lock slots of a brace arm rod of the brace arm assembly of FIG. 17.

FIG. 22B is a top down view of the brace arm rod of the brace arm assembly of FIG. 17.

FIG. 22C is a side view opposite of FIG. 22A illustrating a lock groove of the brace arm rod of the brace arm assembly of FIG. 17.

FIG. 23A is a perspective view of the brace arm assembly of FIG. 17 in an extended position and having a threaded interface end.

FIG. 23B is a partial perspective view of the brace arm assembly of FIG. 17 in a retracted position and having a key-way interface end.

FIG. 28 is a top plan view of an alternative embodiment of a table member having a securing member.

FIG. 29 is a bottom plan view of the table member of FIG. 28 in association with the securing member.

FIG. 33A is a top plan view of a steering wheel table constructed in accordance with the present disclosure comprising a cooling fan built into the table member thereof.

FIG. 33B is an inverted side view of the steering wheel table shown in FIG. 33A.

DETAILED DESCRIPTION OF THE INVENTION

Figure 1A:
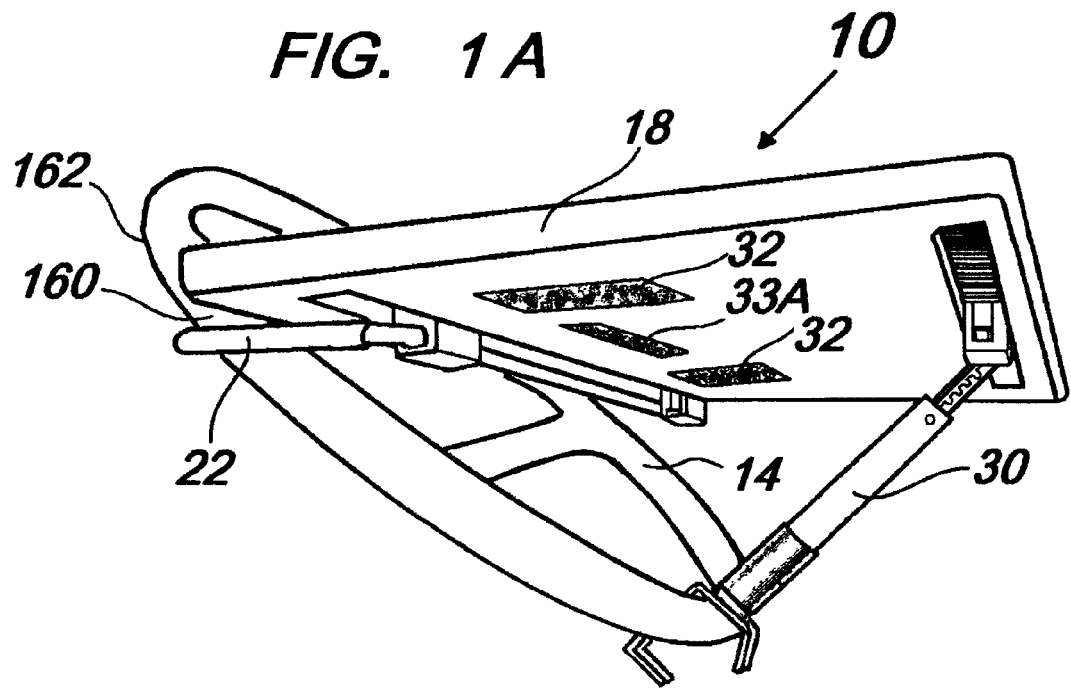
FIG. 1A is a perspective view of an underside of a steering wheel table in accordance with the present invention, in association with a steering wheel of a vehicle.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Figure 1B:
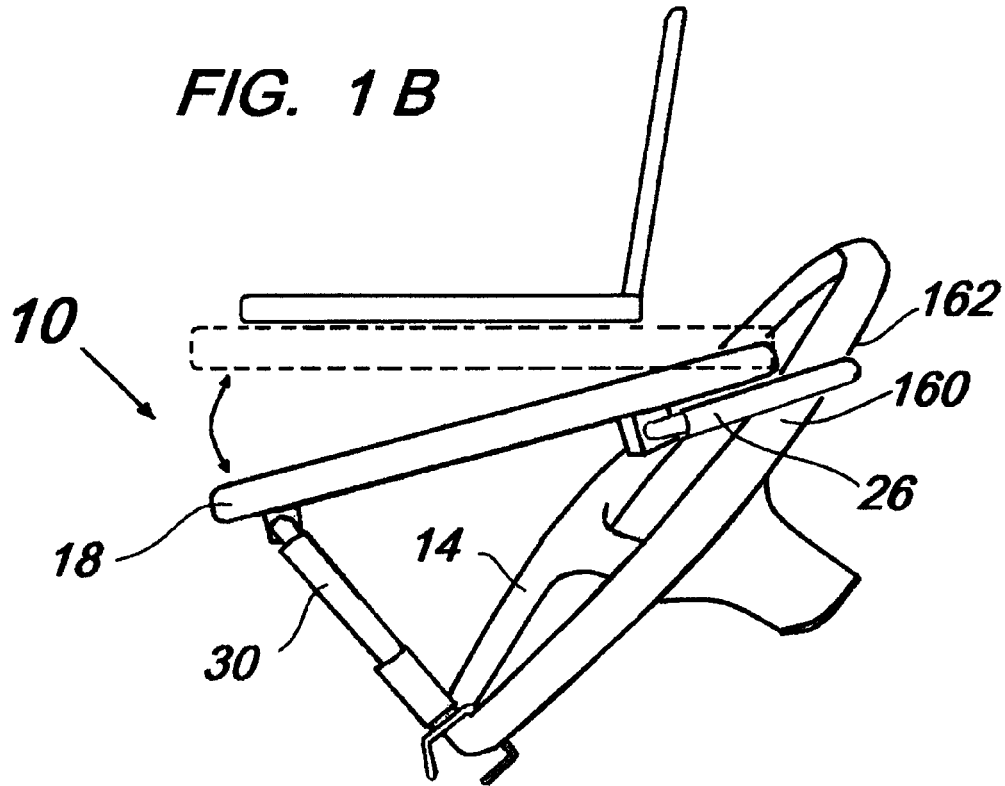
FIG. 1B is a side perspective view of the steering wheel table of FIG. 1A.

Referring now to the drawings and to FIGS. 1A and 1B collectively, shown therein is an exemplary steering wheel table 10 constructed in accordance with the present invention. The steering wheel table 10 is shown as having a table member 18, at least two wheel grasping arms 22 (FIG. 1A) and 26 (FIG. 1B), a brace arm assembly 30 and accessory interfaces 32 connected to the table member 18. In general, the steering wheel table 10 is constructed so as to be attached to the steering wheel 14 of a vehicle. The steering wheel table 10 is also adjustable both vertically (see FIG. 1B) relative to the steering wheel 14 and may also be adjusted in a variety of horizontal configurations relative to the steering wheel 14 (see FIG. 1C). The accessory interfaces 32 of the table member 18 permit an accessory, such as a pillow to be connected to the table member 18. The accessory interfaces 32 can be constructed in a variety of manners, such as a series of hooks or loops which operate to engage a series of hooks or loops disposed on an accessory (e.g., a pillow), although any number of fasteners may be utilized including, snaps, zippers, adhesives—just to name a few.

The brace arm assembly 30 is also provided with a storage connector 33 which will be discussed in more detail below for securing the brace arm assembly 30 to the table member 18 to prevent movement of the brace arm assembly 30 relative to the table member 18. In the embodiment shown in FIGS. 1A and 2, the storage connector 33 is formed from hook and loop material connected to a portion of the brace arm assembly 30 and the table member 18. Preferably at least one of the hook or loop material extends laterally (and is preferably secured via a bonding material such as an adhesive material or a cohesive material) on the exterior surface of the table member 18 and parallel to the track 16 so that the brace arm assembly 30 can be connected to the table member 18 in various lateral positions. Further, the other one of the hook and loop material is preferably wrapped about and secured to the brace arm assembly 30 to form a gripping surface to make the brace arm assembly 30 easier for a user to adjust. Although the preferred embodiment utilizes hook and loop materials to form the storage connector 33, it should be understood that the storage connector 33 can be constructed in other manners, such as by utilizing cooperatively positioned magnets (or a ferrous metal in combination with a magnet), snaps or the like.

Figure 1C:
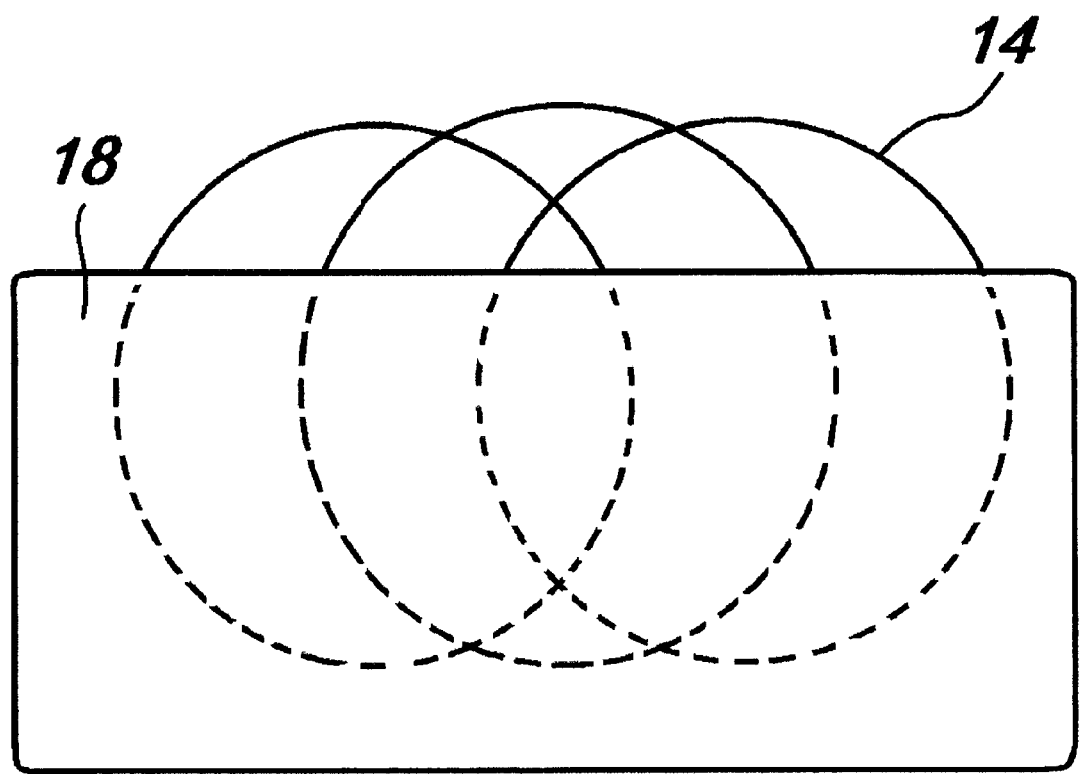
FIG. 1C is a top diagrammatic view of the steering wheel table of FIGS. 1A and 1B in various horizontal positions with respect to the steering wheel of the vehicle.
Figure 2:
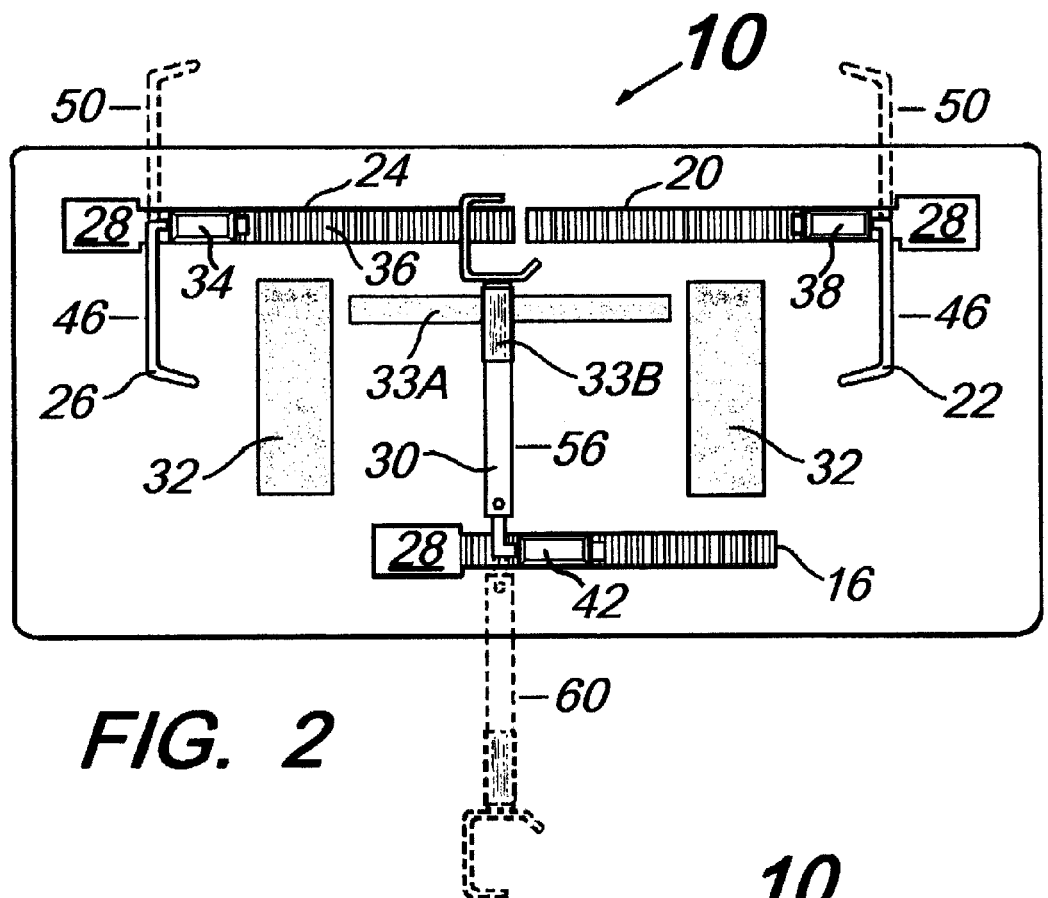
FIG. 2 is a bottom view of the steering wheel table of FIGS. 1A-1C.
Figure 3:
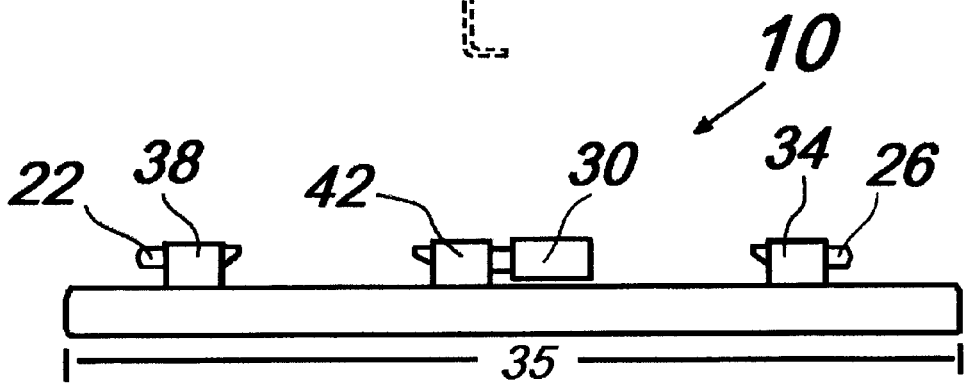
FIG. 3 is a front elevation view of the steering wheel table of FIGS. 1A-1C in a stowed configuration.
Figure 4:
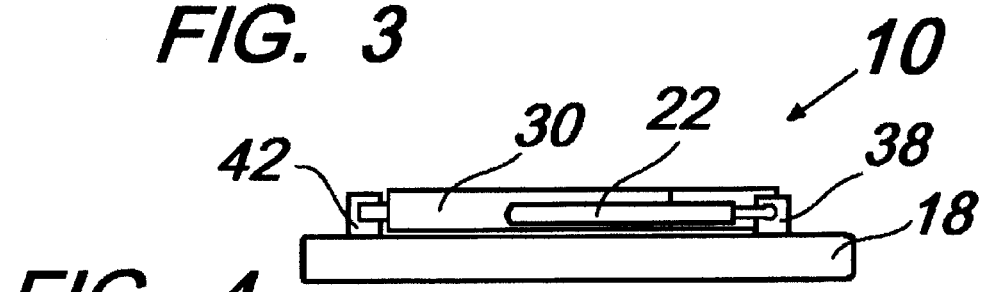
FIG. 4 is a side view of the steering wheel table of FIGS. 1A-1C in a stowed configuration.
Figure 5:
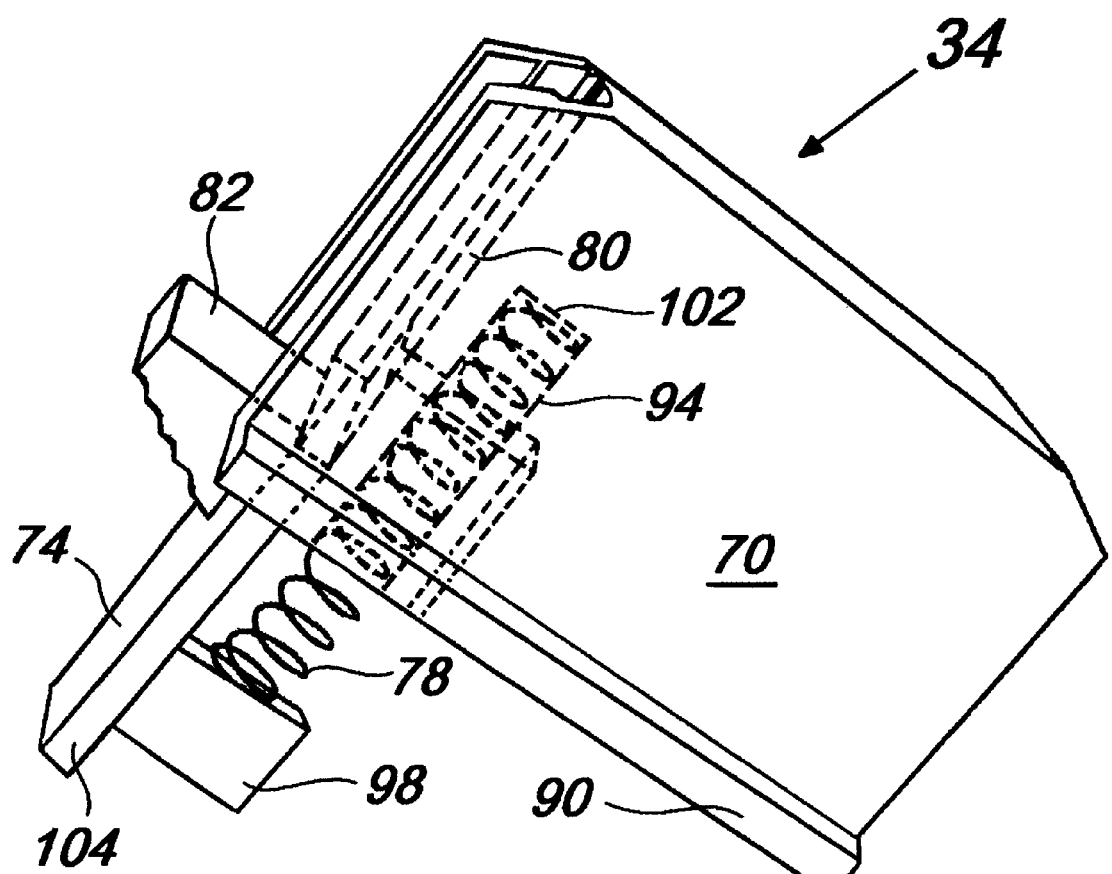
FIG. 5 is a side perspective view of a dolly.
Figure 10:
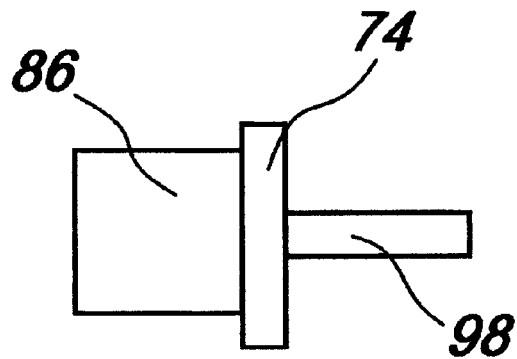
FIG. 10 is a top plan view of the dolly latch of FIG. 9.
Figure 9:
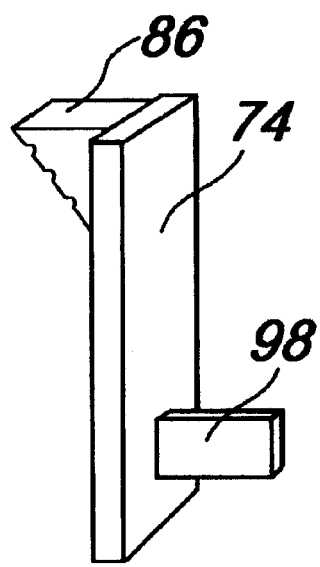
FIG. 9 is a perspective view of a dolly latch.
Figure 11:
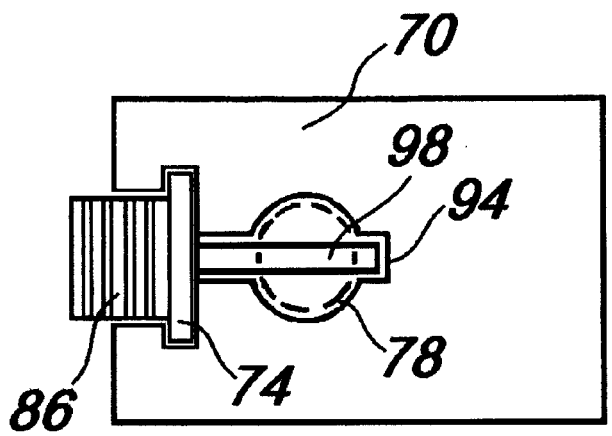
FIG. 11 is a bottom plan view of the dolly of FIGS. 5 and 6.
Figure 12:
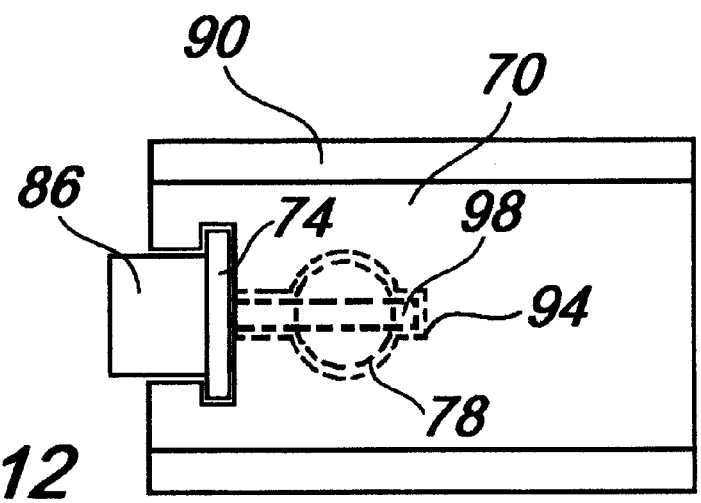
FIG. 12 is a top plan view of the dolly of FIGS. 5 and 6.
Figure 13:
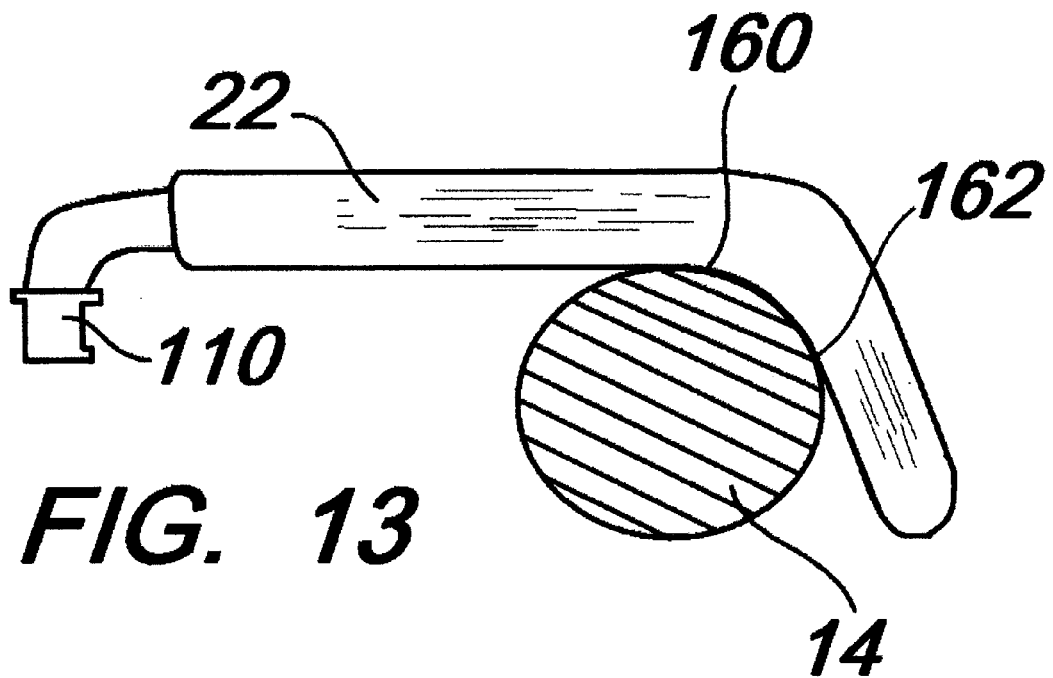
FIG. 13 is a top plan view of a wheel grasping arm having a key-way lock in association with the steering wheel of a vehicle.
Figure 14:
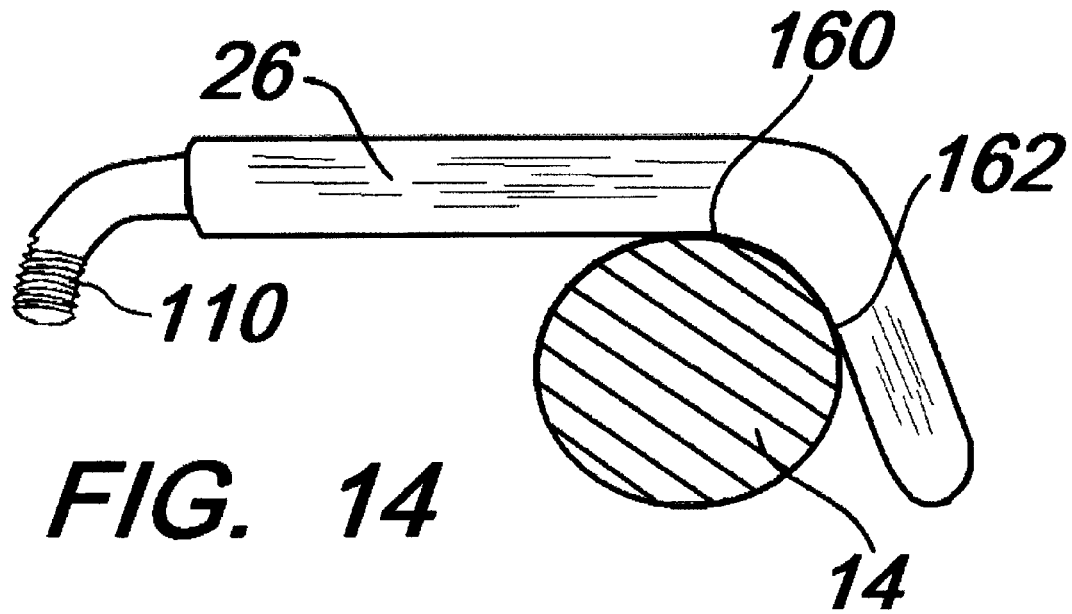
FIG. 14 is a top plan view of a wheel grasping arm having a threaded lock in association with the steering wheel of a vehicle.
Figure 15:
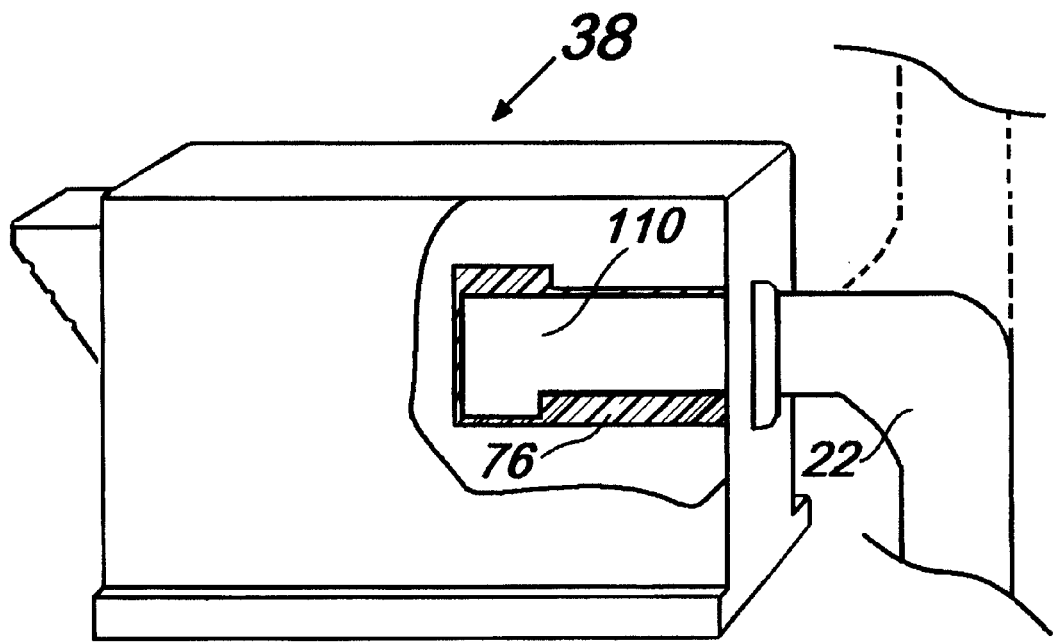
FIG. 15 is a perspective, cutaway view of the dolly of FIGS. 5 and 6 in association with the wheel grasping arm of FIG. 13.
Figure 16:
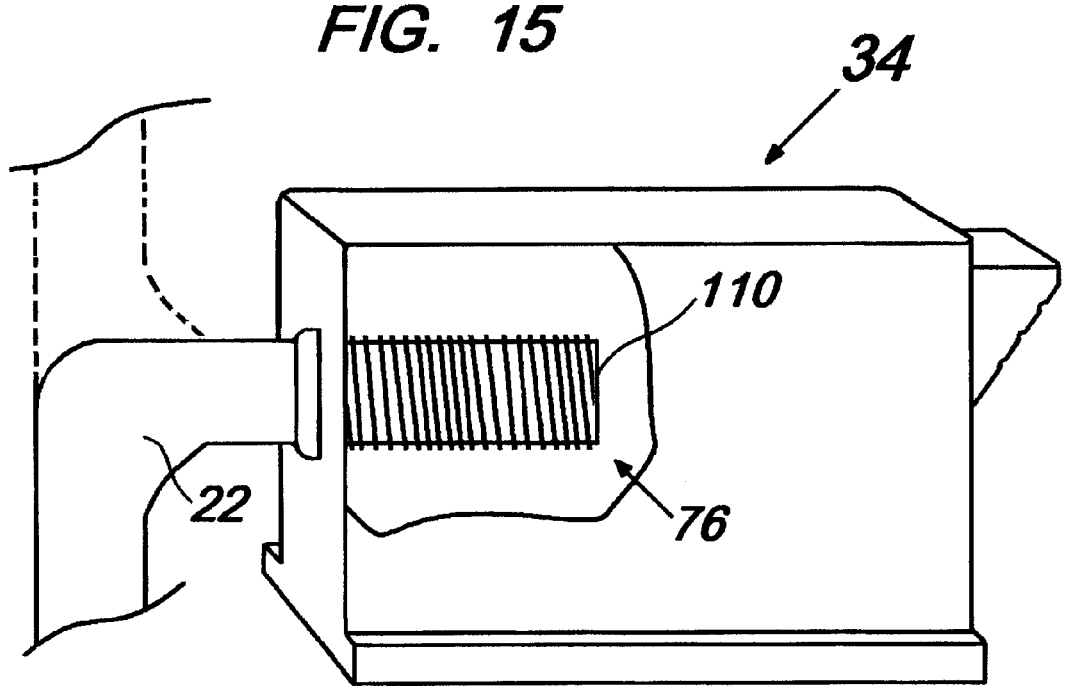
FIG. 16 is a perspective, cutaway view of the dolly of FIGS. 5 and 6 in association with the wheel grasping arm of FIG. 14.
Figure 24:
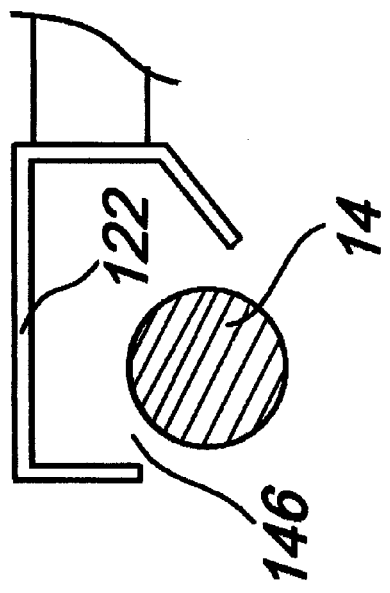
FIG. 24 is a side elevation view of a brace arm flange of the brace arm assembly of FIG. 17.
Figure 25:
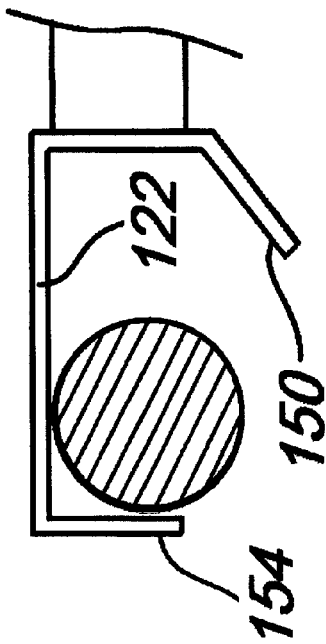
FIG. 25 is a side elevation view of the brace arm flange of the brace arm assembly of FIG. 17 being installed upon or removed from the steering wheel of a vehicle.
Figure 26:
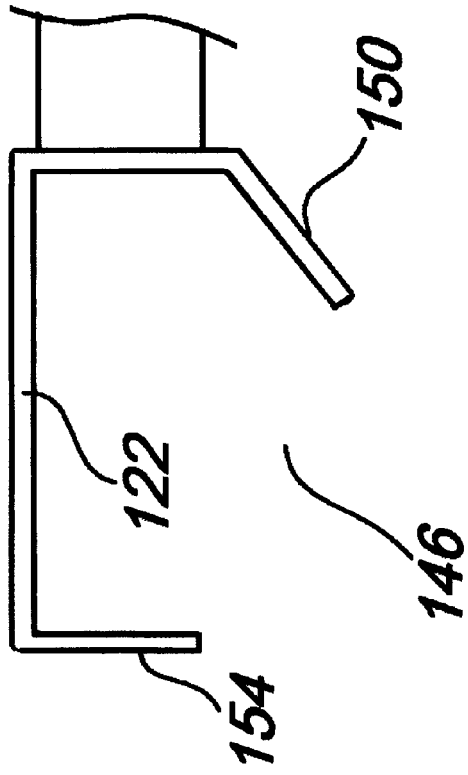
FIG. 26 is a side elevation view of the brace arm flange of the brace arm assembly of FIG. 17 in a working or seated position and engaged with the steering wheel of the vehicle.
Figure 27:
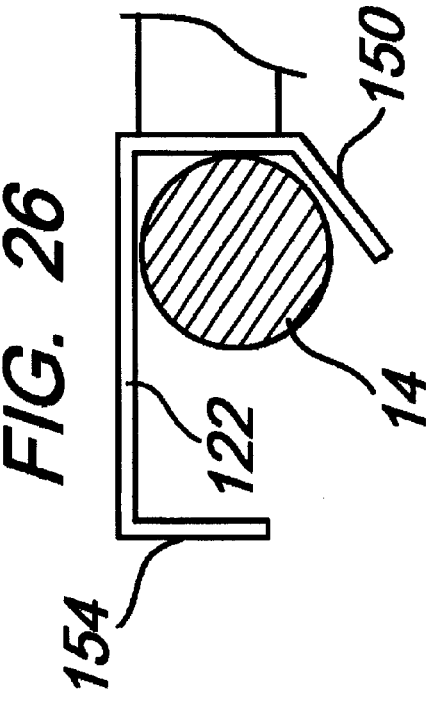
FIG. 27 is a side elevation view of the brace arm flange of the brace arm assembly of FIG. 17 in a stopping accidental disconnection position and engaged with the steering wheel of the vehicle.

Referring now to FIGS. 2-4 collectively, shown therein are multiple views of the steering wheel table 10 of FIGS. 1A-1C. The table member 18 has a rectangular geometry, although any number of different geometric (e.g., triangular, octagonal, circular, polygonal) or non-geometric shapes (e.g., star-shaped, kidney shaped or animal shapes) may be used. Furthermore, the table member 18 may be constructed from a variety of materials, for example, a resin or plastic polymer, natural material(s) such as a wood or fiber based material, metal (such as steel, titanium, aluminum or blends thereof, fiber or glass based materials and combinations thereof. Further, any one of a number of materials that would be known to one of ordinary skill in the art having the present disclosure before them are likewise contemplated for use in accordance with the present invention. The table member 18 may also have one or more cutout sections (not shown) to reduce the overall weight and/or cost of manufacturing the table member 18 of the steering wheel table 10.

The table member 18 may be provided with any of a variety of predetermined scents (including perfumed or the like) and may also be formed of or incorporate a scent absorption material such as a carbon-fiber based material to help eliminate other scents and/or mustiness within the vehicle. It should also be understood that the exterior surface of the table member 18 is preferably smooth, but can be provided with a texture or a non-skid surface or coating material if desired. For example, the table member 18 (or only a portion thereof can be coated with a resilient, non-skid material (such as rubber) to reduce the likelihood that a device, such as a laptop computer or a book will inadvertently fall off of the table member 18.

The table member 18 is shown as having a plurality of tracks 16, 20 and 24, or dolly grooves constructed within the table member 18. The track 16, or "first track" is constructed so as to be oriented substantially parallel to both a width 35 (see FIG. 3) of the table member 18 and the tracks 20 and 24. The tracks 20 and 24 are preferably aligned and may cooperate to form a single "second track" as recited herein. The term "second track" as used herein refers to a continuous or a discontinuous (e.g., multi-part) device(s) which permits adjustment of the width between the wheel grasping arms 22 and 26 and preferably also permits lateral adjustment of the table member 18 relative to the steering wheel 14 as shown in FIG. 1C. In other words, the term "track" as used herein refers to a continuous or a discontinuous (e.g., multi-part) device(s) which permits adjustment of the lateral position of a device, such as the wheel grasping arms 22 and 26 or the brace arm assembly 30.

It will be understood that tracks 16, 20 and 24 are preferably substantially similar in construction to one another and only the making and using of the track 16 will be described hereinafter for purposes of brevity. The track 16 can be provided as a groove fabricated into the top, bottom or edge of the table member 18, although the track 16 may optionally be fabricated separately or otherwise disposed on the top, bottom or edge of an outer surface of the table member 18. The track 16 preferably includes a dolly slot 28 for receiving dolly members 34, 38, and 42. The dolly members 34, 38, and 42 are inserted into the track 16 via the dolly slot 28. Although dolly members 34, 38, and 42 have been disclosed as being inserted into the track 16 via the dolly slot 28, it will be understood that the dolly members 34, 38, and 42 may optionally be placed within the track 16 through cutouts (not shown) in the front or the side of the table member 18. The track 16 is also provided with a plurality of detent grooves 36 (see FIG. 6) which are spaced apart along the length of the track 16 and are configured to receive a portion of a dolly latch as will be discussed later.

The table member 18 is connected to two wheel grasping arms 22 and 26, and the brace arm assembly 30 via dolly members 34, 38 and 42. In general, one wheel grasping arm 22 is disposed on the left hand side of the table member 18 and the other wheel grasping arm 26 is associated with the right hand side of the table member 18. Furthermore, when in use, the brace arm assembly 30 is typically disposed between the wheel grasping arms 22 and 26, although in some configurations the brace arm assembly 30 may be substantially coplanar with one of the wheel grasping arms 22 and 26.

The wheel grasping arms 22 and 26, and the brace arm assembly 30 are disposed substantially perpendicularly to the track 16 and are selectively rotatable between a storage position 46 and a use position 50. The wheel grasping arms 22 and 26 and the brace arm assembly 30 will later be discussed in greater detail. The brace arm assembly 30 is rotatable and useable in all positions between a storage position 56 and a fully rotated position 60 (see FIG. 2).

Referring now to FIGS. 5-12, collectively shown therein is the dolly member 34. In general, the dolly member 34 is provided with a dolly body 70, a dolly lever 74 (also known as a dolly lock latch), and an actuator 78. It will be understood that the dolly member 34 is identical in construction to dolly members 38, and 42. It will be understood that all dolly members may be constructed and sized according to design or aesthetic requirements. More particularly, the dolly body 70 is constructed from a plastic and/or resin, although any one of a number of different materials such as a man-made material (e.g., steel or plastic) or a natural material (e.g., iron, wood or aluminum) may likewise be utilized. The dolly body 70 is provided with a dolly latch groove 80 (also known as a dolly lock latch slot) for slideably receiving the dolly lever 74. Also, the dolly body 70 includes an interface 76 (see FIGS. 6 and 8) for receiving a portion of either the wheel grasping arms 22 and 26 or the brace arm assembly 30 as will be discussed later. The dolly body 70 also includes dolly wings 90 connected to and extending away from the dolly body 70. The dolly wings 90 are configured to fit within a dolly wing groove 84 (also known as a dolly wing slot) of the track 16 as will also be discussed later.

The dolly body 70 also includes an actuator recess 94 (also known as a spring cylinder) having a top surface 102. The actuator recess 94 is milled or formed into the dolly body 70 and is configured to house at least a portion of the actuator 78. The actuator 78 of the dolly member 34 is shown as including a compression spring, although the actuator 78 may comprise, for example, a solenoid, a piece of elastomeric material or a hydraulic or pneumatic cylinder. The dolly lever 74 of the dolly member 34 is provided with a finger lever 86 and a detent 104. The finger lever 86 is configured so as to be gripped by a user in order to move the dolly lever 74. The detent 104 of the dolly lever 74 is constructed so as to fit within the detent grooves 36 of the track 16. When a user moves the dolly lever 74 upward, the actuator 78, for example, a compression spring, is compressed between an actuator lever 98 (also known as a spring lever) of the dolly lever 74 and the top surface 102 of the actuator recess 94; this is known as the moveable position. The upward movement of the dolly lever 74 operates to move the detent 104 of the dolly lever 74 out of the detent grooves 36 of the track 16, to allow a user to slide the dolly member 34 along the track 16 via the dolly wings 90 which fit within the dolly wing groove 80 of the track 16. It will be understood that the dolly wings 90 also operate to secure the dolly member 34 within the track 16 and preclude unwanted removal of the dolly member 34 from the track 16. When the dolly lever 74 is released, the actuator 78, for example, a compression spring moves the dolly lever 74 downward and, in turn, the detent 104 of the dolly lever 74 into one of the detent grooves 36 of the track 16; this is known as the locked position. Moving the detent 104 of the dolly lever 74 into one of the detent grooves 36 of the track 16 locks the dolly member 34 into place. Although the dolly member 34 is shown as securable within the track 16 via engagement with the detent grooves 36, it will be understood that other means of securement can be used, for example, a pressure fitting technique such as a nut and bolt configuration, a wing nut or the like.

Referring now to FIGS. 13-16, such FIGS. collectively show the wheel grasping arms 22 and 26. The wheel grasping arms 22 and 26 are preferably constructed having a substantially L-shaped configuration with a substantially circular cross sectional area, although other cross sectional areas could be used such as a rectangular cross-sectional area, or a triangular cross-sectional area. At least a portion of the wheel grasping arms 22 and 26 may or may not be covered with a non-slip material, for example, a rubber coating or a rubber impregnated fabric coating which allows the wheel grasping arms 22 and 26 to releaseably secure to a portion of the steering wheel 14 of a vehicle without damaging the steering wheel 14.

The wheel grasping arms 22 and 26 are preferably provided with a dolly interface end 110. The dolly interface end 110 is configured to fit within the interface 76 of the dolly member 34, to be rotatable or otherwise movable once inserted into the interface 76, and preferably to be selectively removable therefrom. By way of non-limiting example, the dolly interface end 110 may include a key-way (see FIG. 13) which fits within the interface 76 of the dolly member 34, or a quick-connect device having a movable barrier. Other types of dolly interface ends 110 may include threaded connections or press fit connections. The dolly interface end 110 and the interface 76 of the dolly member 34 cooperate to provide rotatable translation of the wheel grasping arms 22 and 26 from the storage position 46 to the use position 50 (see FIG. 2) once the dolly interface end 110 has been inserted into the interface 76. In one embodiment, the wheel grasping arms 22 and 26 may be connected to the table member 18 in a fixed configuration, for example, the use position 50. In this embodiment, the wheel grasping arms 22 and 26 may be fixedly attached to a top surface, a bottom surface, or an edge of the table member 18 without the use of a dolly member 34. Alternatively, the table member 18 and the wheel grasping arms 22 and 26 can be formed as a unitary structure. The length of the wheel grasping arms 22 and 26 is of sufficient length to hold the table member 18 away from the steering wheel 14 in a suspended configuration allowing the table member 18 to be utilized with convex steering wheel configurations such as when an airbag is present or other steering wheel design characteristics, without impeding the function of the steering wheel table 10. The length of the wheel grasping arms 22 and 26 can vary, but in a preferred embodiment have a length of approximately four to six inches. Furthermore, although not shown, the steering wheel 14 may include a center plane dividing the top section of the steering wheel 14 from the bottom section of the steering wheel 14. Also, the wheel grasping arms 22 and 26 may be further defined as a left wheel grasping arm 26 which is releasably engageable with at least a portion of the top section of the steering wheel 14 at any point located between 180 and 135 relative to the center plane, and more preferably between 180 and 150 relative to the center plane; and a right wheel grasping arm 22 which is releasably engageable with at least a portion of the top section of the steering wheel 14 at any point located between 0 and 45 relative to the center plane, and more preferably between 0 and 30 relative to the center plane.

The wheel grasping arms 22 and 26 are operable to engage the table member 18 (or a device(s) supported thereby) and the steering wheel 14 to grasp the steering wheel 14. More particularly, the wheel grasping arms 22 and 26 typically extend from the bottom of the table member 18 and engage at least a portion of a side 160 (see FIG. 13) and a portion of a back 162 (see FIG. 13) of the steering wheel 14. The weight of the table member 18 (and any item(s) placed on the table member 18) forces the table member 18 downwardly, which causes the wheel grasping arms 22 and 26 to rotate or move upwardly until the wheel grasping arms 22 and 26 engage the bottom of the table member 18 (which stops further rotation or movement) and thereby securely grasp the steering wheel 14 in order to support the table member 18.

Referring now to FIGS. 17-27, collectively showing the brace arm assembly 30. Generally, the brace arm assembly 30 provides vertical support to the table member 18 and also provides angular adjustment (see FIG. 1B) of the table member 18 relative to the steering wheel 14. The brace arm assembly 30 includes a brace arm barrel 114, a brace arm rod 118 and a brace arm flange 122 (also known as a brace arm wheel hook). The brace arm barrel 114 can be constructed as a hollow tube 126 defining a bore for receiving the brace arm rod 118 and includes a lock member 130 extending, at least partially, into the bore of the hollow tube 126.

The brace arm rod 118 is provided with a travel groove 134 (also known in one embodiment as a set screw travel groove), a plurality of spatially disposed (or spaced apart) lock member guides 137 defining a plurality of lock slots 138 therebetween, and a dolly interface 142. Only two of the lock member guides 137 are designated as 137*a* and 137*b* in FIGS. 17 and 20 for purposes of brevity. The lock slots 138 are spaced apart along the length of the brace arm rod 118 and are positioned adjacently to the travel groove 134. The brace arm rod 118 is configured so as to be disposed within the bore of the brace arm barrel 114. More specifically, when the travel groove 134 of the brace arm rod 118 is aligned with the lock member 130 of the brace arm barrel 114 the brace arm rod 118 may be inserted into and move in and out of the brace arm barrel 114, this configuration is referred to as the travel position. To lock the brace arm assembly 30, the brace arm barrel 114 is turned to insert the lock member 130 of the brace arm barrel 114 into one of the plurality of lock slots 138 of the brace arm rod 118, this configuration is referred to as the lock position. In a preferred embodiment, the brace arm barrel 114 can be turned between 45° and 260° to insert the lock member 130 into one of the lock slots 138. In a more preferred embodiment, the brace arm barrel 114 can be turned 90° to insert the lock member 130 into the lock slots 138. Although only one lock member 138 is depicted, it should be understood that more than one lock member 138 can be utilized. Further, although the particular embodiment of the brace arm assembly 30 depicted in FIGS. 17-23B show the brace arm barrel 114 being rotatable relative to the brace arm rod 118 about its longitudinal axis, and the brace arm rod 118 non-rotatable about its longitudinal axis, this does not have to be the case. The brace arm assembly 30 can be constructed to have the brace arm rod 118 rotatable about its longitudinal axis and relative to the brace arm barrel 114 by connecting the brace arm barrel 114 to the dolly body 70 of the dolly member 34, and the brace arm rod 118 to the brace arm flange 122. Further, the brace arm assembly 30 can be constructed to have both the brace arm rod 118 and the brace arm barrel 114 rotatable about their longitudinal axes by constructing a rotatable connection with the dolly body 70 of the dolly member 34.

In a preferred embodiment, the dolly interface end 142 of the brace arm rod 118 is similar to the dolly interface end 110 of the wheel grasping arms 22 and 26. The dolly interface end 142 is configured to fit within the interface 76 of the dolly member 34. By way of non-limiting example, the dolly interface end 142 may include a key-way (see FIG. 23B) which fits within the interface 76 of the dolly member 34. Other types of dolly interface ends 142 may include threaded connections (see FIG. 23A) or press fit connections. The dolly interface end 142 and the interface 76 of the dolly member 34 cooperate to provide rotatable translation of the brace arm rod 118 from the storage position 56 to the fully rotated position 60.

The brace arm flange 122 is connected to the brace arm barrel 114 (or the brace arm rod 118 as desired by the designer) preferably at an end thereof. The brace arm flange 122 defines an opening 146, a top section 150 and a bottom section 154. The brace arm flange 122 is shown as having a substantially C-shaped configuration, although it will be understood that a variety of different shapes and configurations having the same functionalities may likewise be utilized. To install (or remove) the brace arm assembly 30 of the steering wheel table 10 on the steering wheel 14, a section of the bottom portion of the steering wheel 14 is passed through the opening 146 of the brace arm flange 122. Downward forces created by the table member 18 operate to engage the top section 150 of the brace arm flange 122 with a portion of the steering wheel 14. The bottom section 154 of the brace arm flange 122 prevents the brace arm assembly 30 from detaching from the steering wheel 14 in the event of non-desirous bumping or vertical movements of the table member 18. When the brace arm assembly 30 is engaged with the bottom portion of the steering wheel 14 and the wheel grasping arms 22 and 26 are engaged with at least a portion of the side 160 (see FIG. 13) and a portion of the back 162 (see FIG. 13) of the steering wheel 14, the brace arm assembly 30 and the wheel grasping arms 22 and 26 cooperate to form a three point support system for suspending the table member 18 over at least a portion of the steering wheel 14.

Referring now to FIGS. 28 and 29, collectively shown therein is an alternative embodiment of a table member 200. In this embodiment, the table member 200 is provided with securement points 202 and securement member 204. Securement points 202 are shown as notches cut into the table member 200 which receive portions of the securement member 204. It will be understood that the securement points 202 may comprise, for example, posts, nut and bolt fasteners, clips, adhesives, or rivets—just to name a few.

The securement member 204 is shown as comprising a strip of elastomeric material having a first end 206 and a second end 208 configured to engage with the securement points 202. The first end 206 is releasably connectable to a first edge of the table member and the second end 208 is releasably connectable to a second edge of the table member. It will also be understood that the securement member 204 may include, for example, leather, textile, rubber, or the like. Once an item (i.e., book, laptop computer, paperwork, etc.) is placed upon the table member 200, the securement member 204 is utilized to secure the item in place. Also, the table member 200 may optionally include a writing implement holder 222. The writing implement holder 222 may include a molded depression or cutout fabricated into the table member 200 for retaining, for example, a pen, pencil, or other items, such as, coin currency. The table member 200 may optionally include a beverage holder 220. The beverage holder 220 is provided as a cutout in the table member 200 such that a beverage container may be inserted and secured by at least partially passing through the beverage holder 220. It will be understood that the beverage holder 220 may optionally be a molded depression or partial cutout (not creating an aperture) fabricated into the table member 200. In addition, the table member 200 may optionally include a retaining ledge 210A which provides a stop for resting the front edge of a laptop computer or book thereon. The retaining ledge 21 may also be provided with a soft, elastomeric and/or ergonomic material where a user may rest their wrists in order to prevent writing and/or typing fatigue.

Figure 30:
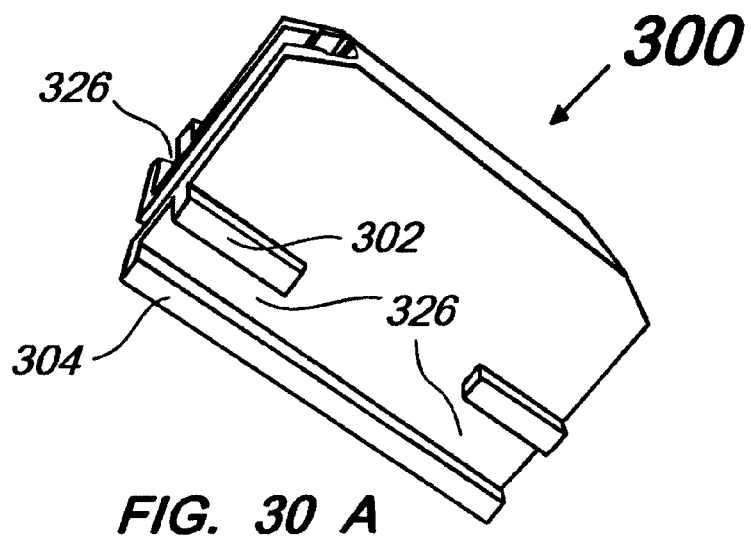
FIG. 30A is an inverted perspective side view of an alternative embodiment of a dolly body having a double wing configuration.
FIG. 30B is a partial, inverted side elevation view of another version of a table member having a track mounted to an exterior surface thereof, rather than formed within the table member as shown in FIG. 8.
FIG. 30C is a partial inverted end elevation view of the dolly body of FIG. 30A in association with the track of FIG. 30B.
Figure 30:
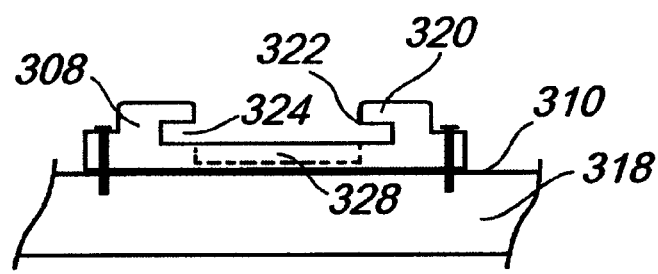
Figure 30:
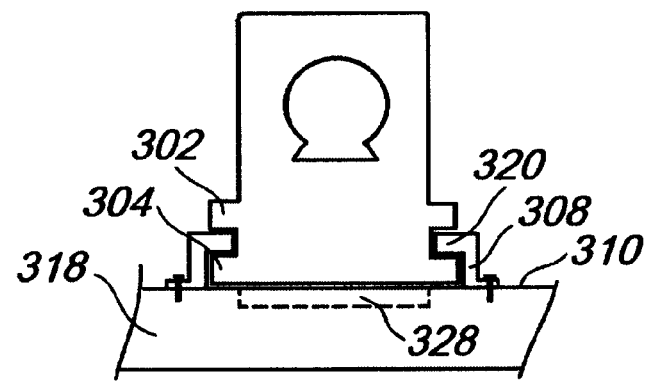

FIGS. 30A-C collectively show an alternative embodiment of the dolly member 300. The dolly member 300 shown in this embodiment is identical in construction to dolly member 34 with the exception that it has an upper dolly wing 302 and lower dolly wing 304 and is constructed so as to operate within a surface mounted track 308.

The surface mounted track 308 is shown as fixedly attached to a surface 310 of the table member 318. The surface 310 can be a top, bottom or an edge of the table member 318. Fasteners used to secure the surface mounted track 308 to the surface 310 of the table member 318 include, but are not limited to, nails, threaded fasteners, adhesives, clips, or the like. It will be understood that surface mounted track 308 may also be fabricated (i.e., molded, milled, etc) onto the surface 310 of the table member 318. The surface mounted track 318 comprises a set of flanges 320 which are provided with ledge portions 322. The flanges 320 can be spaced apart from the surface 310 of the table member 318 to form a track groove 324. The detent grooves 328 may be fabricated into the table member 318. In another embodiment, the surface mounted track 308 may include a base member 330 having the detent grooves 328 (see FIG. 30B). Furthermore, although the dolly member 300 is shown as securable to the surface mounted track 308 via engagement with the detent grooves 328, it will be understood that other means of securement can be used, for example, a pressure fitting technique such as a nut and bolt configuration, a wing nut or the like.

The dolly wings 302 and 304 are spaced apart from one another to define a ledge groove 326. The ledge portion 322 of the flanges 320 are configured to be received within the ledge groove 326 of the dolly member 300. Also, the openings 324 of the flanges 320 are constructed so as to receive the lower dolly wing 304. In operation, the dolly member 300 slides within the openings 324 of the surface mounted track 308 and is precluded from removal by the ledge portions 322 of the surface mounted track 308.

Referring now to FIGS. 1A-30C, in operation, the steering wheel table 10 is configured to be mounted on the steering wheel 14 of the vehicle. The steering wheel table 10 provides a stable platform for using a laptop computer, reading a book, working on paperwork, or eating a meal. Each steering wheel 14 typically has a substantially rounded geometrical configuration (see FIG. 1C). To secure the steering wheel table 10 to the steering wheel 14, a user selectively positions the wheel grasping arms 22 and 26 in order to engage a top portion of the steering wheel 14. To position the wheel grasping arms 22 and 26, a user moves the dolly lever 74 so as to remove the detent 104 of the dolly lever 74 from the detent groove 36 of the track 16. The user may now freely move the wheel grasping arms 22 and 26 horizontally within the tracks 20 and 24 allowing the wheel grasping arms 22 and 26 to move closer together or farther away from one another in order to fit a variety of steering wheel 14 sizes.

The wheel grasping arms 22 and 26 should be spaced apart from one another at a distance such that they both engage opposite sides (both left and right) of the steering wheel 14. Furthermore, the wheel grasping arms 22 and 26 should preferably contact the steering wheel 14 at above the center of the steering wheel 14, and thus, at positions where the width of the steering wheel 14 is increasing. The wheel grasping arms 22 and 26 should preferably contact both the side 160 and the back 162 of the steering wheel 14. By way of non-limiting example, if the wheel grasping arms 22 and 26 are secured at a distance of 13 inches apart and the steering wheel 14 has a diameter of, for example, 15 inches, the wheel grasping arms 22 and 26 will not slip over the steering wheel 14, and downward pressure from the table member 18 and workload will increase the wheel grasping arms 22 and 26 grasping hold.

Next, a user inserts the brace arm flange 122 of the brace arm assembly 30 onto the lower or bottom portion of the steering wheel 14 through the opening 146 of the brace arm flange 122 to complete the securement of the steering wheel table 10. The brace arm assembly 30 is selectively extendable to change the angle of the table member 18 relative to the steering wheel 14 (see FIG. 1B). To lengthen/shorten the brace arm assembly 30, a user moves the brace arm barrel 114 (or the brace arm rod 118) to the travel position as previously discussed and moves the brace arm rod 118 either in or out of the brace arm barrel 114. To lock the brace arm barrel 114 into place, a user moves the brace arm barrel 114 to the lock position.

The wheel grasping arms 22 and 26 and the brace arm assembly 30 cooperate to provide a three-point support system for securing the table member 18 above the lower portion of the steering wheel 14. The weight of the workload (the table member 18 plus any items) on the table member 18 is transferred onto the two wheel grasping arms 22 and 26 and the brace arm assembly 30 and ultimately to the steering wheel 14.

Once the steering wheel table 10 is secured to the steering wheel 14, a user may then place any desired items onto the table member 18. Also, a user may secure an item such as a laptop computer (see FIG. 1A) to the table member 18 via the securement member 204 by placing the laptop computer on the table member 18 and stretching the securement member 204 across the laptop computer.

Figure 31:
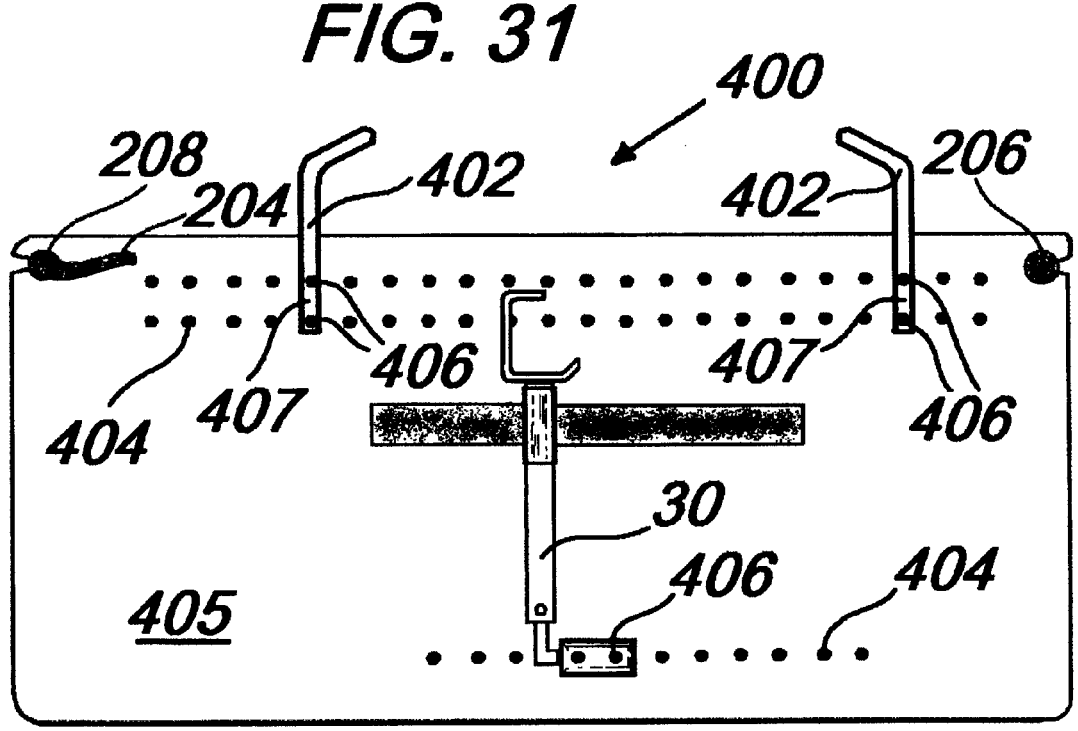
FIG. 31 is a bottom plan view of an alternate embodiment of a steering wheel table constructed in accordance with the present invention having tracks formed of a plurality of aligned apertures for attaching at least two wheel grasping arms and a brace arm assembly to a table member thereof.
Figure 32:
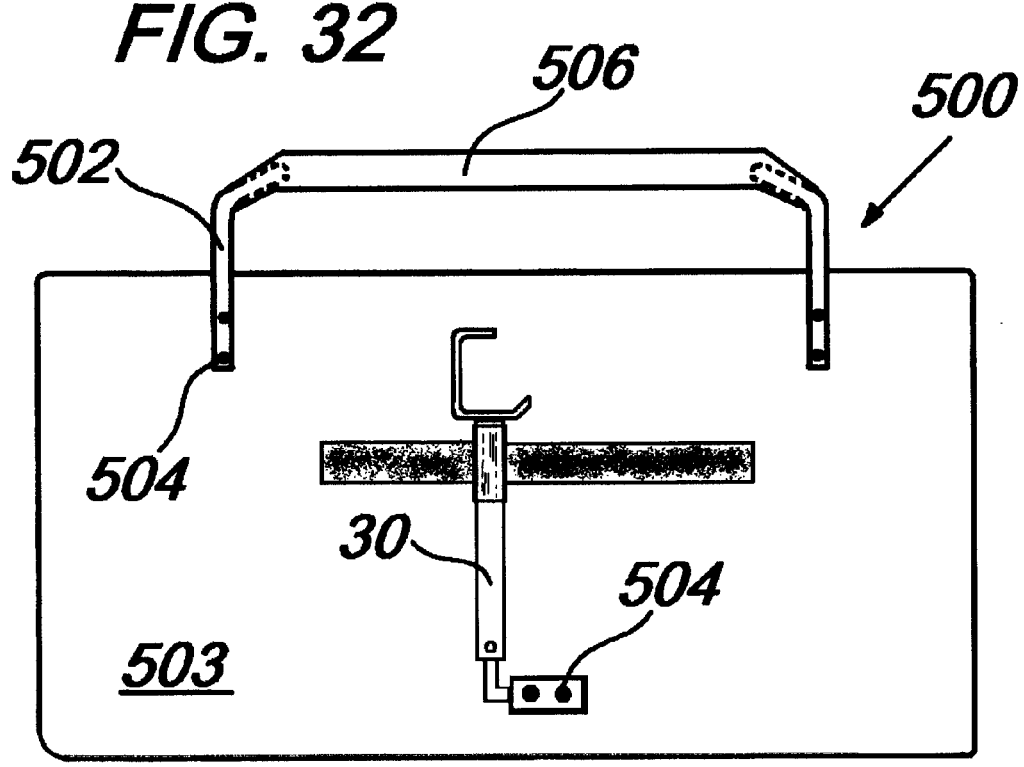
FIG. 32 is a bottom plan view of a yet another embodiment of a steering wheel table constructed in accordance with the present invention having at least two wheel grasping arms and a brace arm assembly non-adjustably attached to a table member thereof.

Shown in FIGS. 31 and 32 are two alternative embodiments of steering wheel tables 400 and 500 constructed in accordance with the present invention. The steering wheel table 400 is similar in construction and function to the steering wheel table 10, discussed above, with the exception that the steering wheel table 400 includes tracks 404 constructed of aligned apertures formed in a table member 405 and fabricated to receive a threaded device, such as a screw or bolt, a keyed device, or other device for connecting wheel grasping arms 402, and brace arm assembly 30 to the table member 405. The wheel grasping arms 402 are similar in construction and function as the wheel grasping arms 22 and 26 discussed above, but are provided with a flange 407 to receive connectors 406 for connecting the flange 407 to the table member 405.

The steering wheel table 500 is similar in construction and function as the steering wheel tables 10 and 400 discussed above, but does not include any lateral adjustment for the wheel grasping arms 502, or the brace arm assembly 30. In this regard, the wheel grasping arms 502 can be set at a fixed distance apart to fit most steering wheels. The wheel grasping arms 502 are attached (or otherwise secured to a table member 503) in a fixed position by connectors 504. The connector 504 can be a threaded device, such as a screw, a keyed device, or any other device capable of attaching the wheel grasping arm 502 to the table member. The brace arm assembly 30 is attached in a fixed position relative to the table member via connectors 504. The steering wheel tables 10, 400 and 500 can optionally be provided with a carrying handle 506 (shown in FIG. 32), which is shown by way of example as a tube connected to the wheel grasping arms 502. However, it should be understood that the carrying handle 506 can be provided in other manners, such as by cutting an ovular shape through the table members 18, 405 and 503.

It will be understood from the foregoing description that various modifications and changes may be made in the preferred and alternative embodiments of the present invention without departing from its true spirit. For example, the brace arm barrel 114 can be adapted to have the lock member guides forming the lock slots, while the brace arm rod 118 can be provided with the lock member. Alternatively, the brace arm assembly can be adjustable using other technique(s) or device(s). For example, either one of the brace arm rod or the brace arm barrel can include a movable barrier, such as a spring based actuator, or threads to permit adjustment of the relative positions and thus the combined length of the brace arm rod and the brace arm barrel.

The steering wheel table 10 may be provided with a number of optional accessories. Specifically, the steering wheel table 10 may include ventilation grooves or apertures fabricated into the top surface of the table member 18 to improve airflow under the laptop computer positioned on the top surface of the table member 18. To aid in increasing airflow under the laptop computer, the steering wheel table 10 may further include at least one, but optionally more than one cooling fan 223 (FIGS. 33A-33B) fabricated into the table member 18 or located on a top surface, a bottom surface or an edge of the table member 18, but more preferably the top surface. It will be understood that if the cooling fan 223 is located on the bottom surface of the table member 18, the table member 18 should preferably include a plurality of apertures which provide fluid communication between the top surface of the table member 18 and the bottom surface of the table member 18.

Also, the table member 10 may optionally include a plurality of USB ports disposed on the top surface, the bottom surface or an edge of the table member 18. The USB ports are preferably in electrical communication with the laptop computer via an electrical connection (a cable, a Bluetooth dongle, and the like) and/or a docking port disposed on or fabricated into the table member 18.

The steering wheel table 10 may also optionally include a power inverter for converting direct current from a vehicle accessory port (e.g., cigarette lighter) to alternating current which may be utilized to power not only the laptop computer, but the cooling fan, a light source and/or any other accessory utilizing an alternating current.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An adjustable steering wheel table for a vehicle steering wheel having a diameter, a bottom section and a top section having a side and a back, the steering wheel table comprising:
    a table member having a length, and a width;
    a first track extending across at least a portion of the width of the table member;
    a second track extending across at least a portion of the width of the table member;
    at least two wheel grasping arms connected to the first track of the table member so as to adjust the distance between the at least two wheel grasping arms to a distance less that the steering wheel diameter, the at least two wheel grasping arms configured to contact at least a portion of the back and at least a portion of the side of the top section of the vehicle steering wheel; and
    a brace arm assembly pivotally connected to the second track relative to the table member, the brace arm assembly releasably engageable with the bottom section of the vehicle steering wheel, the brace arm assembly comprising a brace arm barrel and a brace arm rod; the brace arm assembly comprising:
    the brace arm barrel supporting a lock member, the brace arm barrel being disposed on the brace arm rod and movable between a retracted position and an extended position, the brace arm rod having a plurality of spatially disposed lock member guides forming lock slots therebetween, the brace arm barrel being movable on the brace arm rod for selectively and removably positioning the lock member into respective lock slots for adjusting the combined length of the brace arm barrel and the brace arm rod.

2. The adjustable steering wheel table according to claim 1, wherein the at least two wheel grasping arms and the brace arm assembly cooperate to suspend the table member above the bottom section of the vehicle steering wheel.

3. The adjustable steering wheel table according to claim 2, wherein the brace arm assembly further comprises a brace arm flange releasably engageable with at least a portion of the bottom section of the vehicle steering wheel.

4. The adjustable steering wheel table according to claim 1, wherein the at least two wheel grasping arms each comprise an elongated member configured to contact at least a portion of the side of the vehicle steering wheel and a flange member configured to contact at least a portion of the back of the vehicle steering wheel.

5. The adjustable steering wheel table according to claim 4, wherein the flange member of the at least two wheel grasping arms comprises a region of non-slip material disposed on at least a portion of the flange member.

6. The adjustable steering wheel table according to claim 5, wherein the brace arm rod extends between the table member and the vehicle steering wheel when the adjustable steering wheel table is installed upon the vehicle steering wheel, and further comprising a brace arm flange rotatably connected to the brace arm rod.

7. The adjustable steering wheel table according to claim 1, wherein the table member is pivotally adjustable via operation of the brace arm assembly.

8. The adjustable steering wheel table according to claim 1, wherein the brace arm further comprises a flange configured to releasably engage the bottom portion of a vehicle steering wheel, and at least a portion of the brace arm flange of the brace arm assembly comprises a region of non-slip material disposed on at least a portion of the brace arm flange.

9. The adjustable steering wheel table according to claim 1, wherein at least a portion of the top surface of the table member comprises a region of non-slip material.

10. The adjustable steering wheel table according to claim 1, further comprising a securement member attached to the table member and extending across the width of the table member.

11. The adjustable steering wheel table according to claim 10, wherein the securement member comprises a strip of elastomeric material having a first end and a second end, the first end releasably connectable to a first edge of the table member and the second end releasably connectable to a second edge of the table member.

12. The adjustable steering wheel table according to claim 1, wherein the table member further comprises at least one cooling fan.

13. An adjustable steering wheel table for a vehicle steering wheel having a diameter, a bottom section and a top section having a side and a back, the steering wheel table comprising:
    a table member having a length, and a width;
    a first track extending across at least a portion of the width of the table member;
    a second track extending across at least a portion of the width of the table member;
    at least two wheel grasping arms connected to the first track of the table member so as to adjust the distance between the at least two wheel grasping arms to a distance less than the steering wheel diameter, the at least two wheel grasping arms configured to contact at least a portion of the back and at least a portion of the side of the top section of the vehicle steering wheel;
    a brace arm assembly pivotally connected to the second track relative to the table member, the brace arm assembly releasably engageable with the bottom section of the vehicle steering wheel;

wherein the steering wheel of the vehicle comprises a center plane dividing the top section of the steering wheel from the bottom section of the steering wheel; and wherein the at least two wheel grasping arms comprise:

a left wheel grasping arm configured to contact at least a portion of the back and at least a portion of the side of the top section of the vehicle steering wheel at any point located between 180 and 135 degrees relative to the center plane; and a right wheel grasping arm configured to contact at least a portion of the back and at least a portion of the side of the top section of the vehicle steering wheel at any point located between 0 and 45 degrees relative to the center plane.

14. An adjustable steering wheel table, for a vehicle steering wheel having a diameter, a bottom section and a top section having a side and a back, the steering wheel table comprising:

a table member having a length, and a width;

a first track extending across at least a portion of the width of the table member;

a second track extending across at least a portion of the width of the table member;

at least two wheel grasping arms connected to the first track of the table member so as to adjust the distance between the at least two wheel grasping arms to a distance less than the steering wheel diameter, the at least two wheel grasping arms configured to contact at least a portion of the back and at least a portion of the side of the top section of the vehicle steering wheel;

a brace arm assembly pivotally connected to the second track relative to the table member, the brace arm assembly releasably engageable with the bottom section of the vehicle steering wheel;

further comprising three dolly assemblies wherein the at least two wheel grasping arms are slideably connected to the first track of the table member via respective dolly assemblies and the brace arm assembly is slideably connected to the second track of the table member via one of the dolly assemblies, each of the dolly assemblies comprising:

a dolly body having a dolly latch groove, an actuator recess and at least one dolly wing constructed so as to be received within a dolly wing slot fabricated into the first track;

a dolly lever comprising a detent, the dolly lever constructed so as to be received within the dolly latch groove of the dolly body, the dolly lever selectively positionable between a locked position and a moveable position;

an actuator having an extended position and a retracted position, the actuator positioned at least partially within the actuator recess of the dolly body and connected to at least a portion of the dolly lever, wherein the actuator operates to move the dolly lever into the locked position when the actuator is in the extended position;

wherein when the dolly lever is in the locked position, the detent of the dolly lever is configured so as to be received within at least one of a plurality of detent grooves fabricated into the first track of the table member.

15. An adjustable steering wheel table for a vehicle steering wheel having a diameter, a bottom section and a top section having a side and a back, the steering wheel table comprising:

a table member having a length and a width;

a first track extending across at least a portion of the width of the table member;

a second track extending across at least a portion of the width of the table member;

at least two wheel grasping arms slideably connected to the first track of the table member so as to be selectively movable towards and away from one another so as to adjust the distance between the at least two wheel grasping arms to a distance less than the diameter of the vehicle steering wheel, the at least two wheel grasping arms configured to be contact at least a portion of the back and at least a portion of the side of the top section of the vehicle steering wheel; and a brace arm assembly pivotally and slideably connected to the second track relative to the table member, the brace arm assembly comprising:

a brace arm barrel;

a brace arm rod configured to be received at least partially within the brace arm barrel;

wherein one of the brace arm barrel and the brace arm rod further comprise a travel groove and a plurality of lock member guides defining lock slots adjacent to the travel groove;

a lock member connected to the other one of the brace arm barrel and the brace arm rod; wherein the brace arm barrel and the brace arm rod are positionable in a lock position and a travel position; and wherein the lock member travels along the travel groove when the brace arm barrel and the brace arm rod are in the travel position to adjust the combined lengths of the brace arm rod and the brace arm barrel, and the lock member is configured to be received within one of the plurality of lock slots when the brace arm barrel and the brace arm rod are in the lock position.

16. An adjustable brace arm assembly comprising:

a brace arm barrel;

a brace arm rod configured to be received at least partially within the brace arm barrel;

wherein one of the brace arm barrel and the brace arm rod further comprise a travel groove and a plurality of lock member guides defining lock slots adjacent to the travel groove;

a lock member connected to the other one of the brace arm barrel and the brace arm rod;

wherein the brace arm barrel and the brace arm rod are is positionable in a lock position and a travel position; and wherein the lock member travels along the travel groove when the brace arm barrel and the brace arm rod are in the travel position to adjust the combined lengths of the brace arm rod and the brace arm barrel, and the lock member is configured to be received within one of the plurality of lock slots when the brace arm barrel and the brace arm rod are in the lock position.

* * * * *

UNITED STATES PATENT AND TRADEMARK OFFICE
CERTIFICATE OF CORRECTION

| | |
|---|---|
| PATENT NO. | : 8,079,312 B2 |
| APPLICATION NO. | : 12/242465 |
| DATED | : December 20, 2011 |
| INVENTOR(S) | : Ronald W. Long |

Page 1 of 1

It is certified that error appears in the above-identified patent and that said Letters Patent is hereby corrected as shown below:

Column 10, line 50: After "ledge" delete "21" and replace with -- 210A --.

Column 16, line 49: After "brace arm rod" delete "is".

Signed and Sealed this
Twenty-eighth Day of February, 2012

David J. Kappos
*Director of the United States Patent and Trademark Office*